United States Patent
Shashidhar et al.

(10) Patent No.: US 12,375,400 B2
(45) Date of Patent: *Jul. 29, 2025

(54) TRAFFIC HANDLING FOR EVPN E-TREE

(71) Applicant: Arista Networks, Inc., Santa Clara, CA (US)

(72) Inventors: Akhil Shashidhar, Cedar Park, TX (US); Aaron David Bamberger, Austin, TX (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/667,646

(22) Filed: May 17, 2024

(65) Prior Publication Data

US 2024/0305565 A1 Sep. 12, 2024

Related U.S. Application Data

(63) Continuation of application No. 18/192,578, filed on Mar. 29, 2023, now Pat. No. 12,003,414.

(60) Provisional application No. 63/485,689, filed on Feb. 17, 2023.

(51) Int. Cl.
*H04L 45/50* (2022.01)
*H04L 12/46* (2006.01)
*H04L 45/00* (2022.01)
*H04L 45/44* (2022.01)
*H04L 45/48* (2022.01)

(52) U.S. Cl.
CPC .......... *H04L 45/50* (2013.01); *H04L 12/4641* (2013.01); *H04L 45/32* (2013.01); *H04L 45/44* (2013.01); *H04L 45/48* (2013.01)

(58) Field of Classification Search
CPC ........ H04L 45/50; H04L 45/32; H04L 45/44; H04L 45/48; H04L 12/4641
See application file for complete search history.

(56) References Cited

U.S. PATENT DOCUMENTS

| | | |
|---|---|---|
| 8,724,629 B1 | 5/2014 | Goli et al. |
| 11,469,991 B1 | 10/2022 | Mahadevan et al. |
| 11,575,541 B1 | 2/2023 | Styszynski et al. |
| 2015/0281096 A1 | 10/2015 | Boutros et al. |
| 2020/0396103 A1 | 12/2020 | Brissette et al. |
| 2021/0119827 A1 | 4/2021 | Codandam et al. |
| 2021/0352011 A1 | 11/2021 | Boutros et al. |
| 2022/0078046 A1 | 3/2022 | Wang et al. |

(Continued)

OTHER PUBLICATIONS

Hao Y Li L Wang et al., Multicast Group Address Auto-Provisioning For NVO3 Network, Internet Engineering Task Force (IETF), Jun. 2015, pp. 1-9.

(Continued)

*Primary Examiner* — Blake J Rubin
(74) *Attorney, Agent, or Firm* — Treyz Law Group, P.C.; Tianyi He

(57) ABSTRACT

An EVPN network device may advertise an EVPN IMET (type-3) route in a corresponding message to one or more peer EVPN network devices. The EVPN IMET route advertisement message may include an E-tree extended community indicating a leaf or root designation of a locally attached site at the advertising EVPN network device. The inclusion of the E-tree extended community in the EVPN IMET route advertisement message may provide desired traffic handling for implementing an EVPN E-tree service such as handling of BUM traffic.

19 Claims, 19 Drawing Sheets

(56) References Cited

U.S. PATENT DOCUMENTS

| | | |
|---|---|---|
| 2022/0200903 A1 | 6/2022 | Boutros et al. |
| 2022/0247669 A1 | 8/2022 | Burdet et al. |
| 2022/0311643 A1 | 9/2022 | Chundu et al. |
| 2022/0321458 A1 | 10/2022 | Lin et al. |
| 2023/0031683 A1 | 2/2023 | He et al. |
| 2023/0073266 A1 | 3/2023 | Boutros et al. |

OTHER PUBLICATIONS

A. Sajassi, ED et al., Ethernet-Tree (E-Tree) Support in Ethernet VPN (EVPN) and Provider Backbone Bridging EVPN (PBB-EVPN), Internet Engineering Task Force (IETF), Jan. 2018, pp. 1-23.

TRAFFIC HANDLING FOR EVPN E-TREE

This application is a continuation of U.S. non-provisional patent application Ser. No. 18/192,578, filed Mar. 29, 2023, which claims the benefit of U.S. provisional patent application No. 63/485,689, filed Feb. 17, 2023. These applications are hereby incorporated by reference herein in their entireties.

BACKGROUND

This relates to network devices, and more particularly, to network devices that handle traffic for EVPN E-tree.

In providing EVPN E-tree service, provider edge devices can each be attached to root site(s) and/or leaf site(s). Traffic from a root site should be able to reach other root sites and leaf sites, whereas traffic from a leaf site should be able to reach root sites but not other leaf sites.

DETAILED DESCRIPTION

A network can convey network traffic (e.g., in the form of one or more packets, one or more frames, etc.) between host devices. To properly forward the network traffic, the network can include a number of network devices. Some of these network devices may implement an Ethernet Virtual Private Network (EVPN) process and may exchange address reachability information represented by EVPN route information with one another and process the exchanged information. These network devices are sometimes referred to herein as EVPN devices or EVPN peer network devices.

Configurations in which the exchange of EVPN route information (e.g., hardware address reachability information) occurs using Border Gateway Protocol (BGP), or more specifically Multiprotocol BGP (MP-BGP), and/or with Virtual Extensible LAN (VXLAN) or Multiprotocol Label Switching (MPLS) technology (e.g., using VXLAN or MPLS infrastructure, MPLS labels, etc.) are sometimes described herein as illustrative examples. If desired, the exchange of hardware address reachability information can occur with other types of control plane routing protocol and utilizing other types of underlying network infrastructure.

Figure 1:
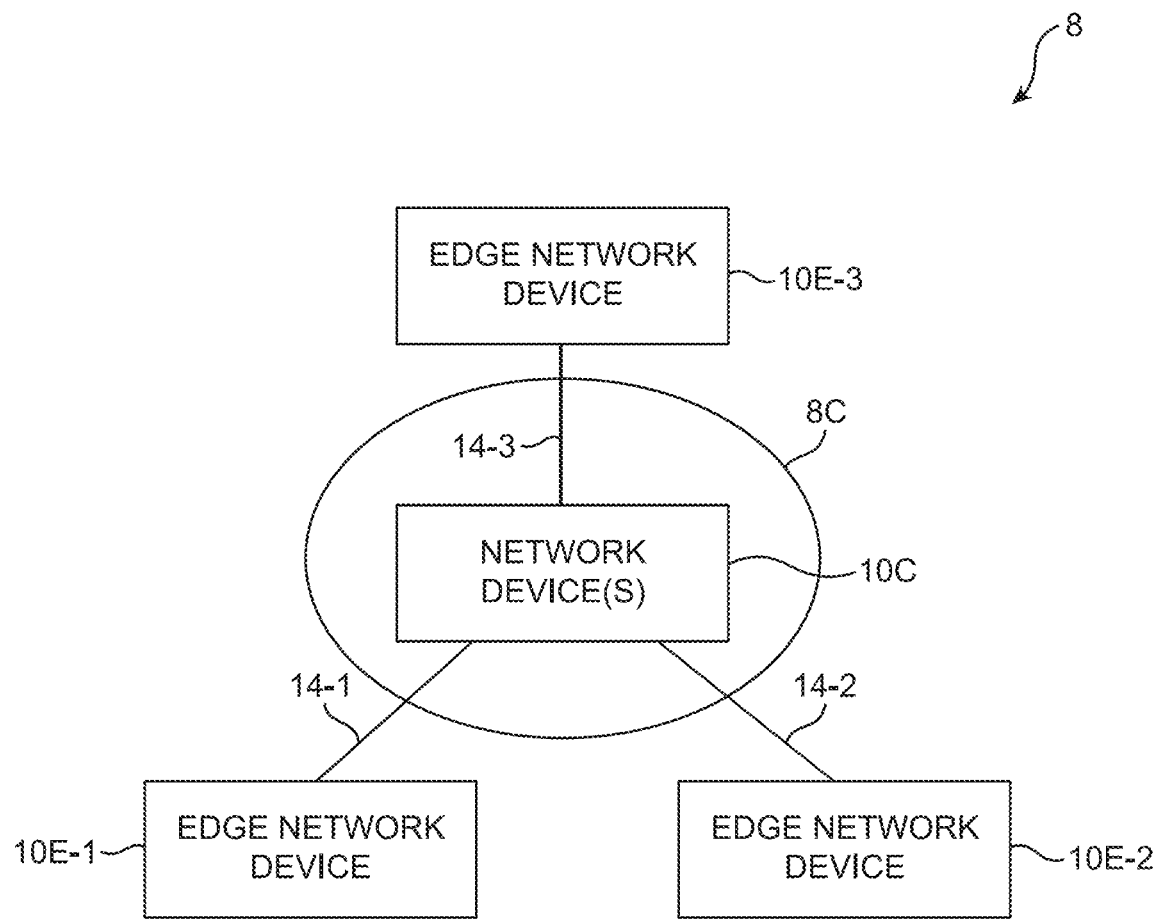
FIG. 1 is a diagram of an illustrative network having one or more edge network devices in accordance with some embodiments.

An illustrative networking system in which EVPN peer devices operate is shown in FIG. 1. A network such as network 8 may be of any suitable scope and/or form part of a larger network of any suitable scope. As examples, network 8 may include, be, or form part of one or more local segments, one or more local subnets, one or more local area networks (LANs), one or more campus area networks, a wide area network, etc. Network 8 may include any suitable number of different network devices that connect corresponding host devices of network 8 to one another. If desired, network 8 may include or be coupled to internet service provider networks (e.g., the Internet) or other public service provider networks, private service provider networks (e.g., multiprotocol label switching (MPLS) networks), and/or other types of networks such as telecommunication service provider networks (e.g., a cellular network based on one or more standards as described in the 3GPP specifications such as GSM, UMTS, LTE, 5G, etc.).

As shown in FIG. 1, network 8 may include a core network or core network portion 8C interconnecting different edge networks or edge network portions (sometimes referred to herein as sites). As one illustrative example, core network portion 8C may form a backbone network such as a service provider network (e.g., an Internet or IP service provider network, a MPLS network, a cloud provider network, or generally a communication network core). Core network portion 8C may connect different edge network portions belonging to entities (e.g., customers) different from (or the same as) those that provide core network portion 8C. In configurations in which network devices implement one or more EVPN instances over core network portion 8C, core network portion 8C may sometimes be referred to herein as an EVPN core or generally an underlay network.

Core network devices 10C may sometimes be referred to as provider (network) core devices whereas edge network devices 10E may sometimes be referred to as provider (network) edge devices. Core network portion 8C may include core network devices 10C that are interconnected with each other within core portion 8C. Network paths 14 (e.g., one or more paths 14-1, one or more paths 14-2, and one or more paths 14-3) couple one or more core network devices 10C to edge network devices 10E (e.g., devices 10E-1, 10E-2, and 10E-3) that interface the core network devices 10C with the edge network portions. These edge network portions (e.g., sites) may include their own set of network devices and hosts (not explicitly shown in FIG. 1).

Network devices in network 8 such as provider edge network devices 10E, provider core network devices 10C, and network devices in the edge network portions may each include or be a switch (e.g., a multi-layer L2/L3 switch), a bridge, a router, a gateway, a hub, a repeater, a firewall, a wireless access point, a network device serving other networking functions, a network device that includes the functionality of two or more of these devices, a management device that controls the operation of one or more of these network devices, and/or other types of network devices. Configurations in which provider edge network devices 10E-1, 10E-2, and 10E-3 are (multi-layer) leaf switches or routers, or generally include routing functionalities (e.g., implements routing protocols) are described herein as an example.

Host devices or host equipment in network 8 (e.g., hosts in the edge network portions or sites) serving as end hosts of network 8 may each include or be a computer, a server or server equipment, a portable electronic device such as a cellular telephone, a laptop, etc., a network service and/or storage device, network management equipment that manages and controls the operation of one or more of host devices and network devices, and/or any other suitable types of specialized or general-purpose host computing equipment, e.g., running one or more client-side and/or server-side applications.

Networking equipment (e.g., network devices and host devices) in network 8 may be connected by one or more wired technologies or standards such as Ethernet (e.g., using copper cables and/or fiber optic cables), thereby forming a wired network portion of network 8 (e.g., including core network portion 8C and portions of edge network portions). If desired, network 8 may also include one or more wireless network portions that extend from the wired network portion.

In some configurations described herein as an example, edge network devices 10E may implement an EVPN over core network 8C, and accordingly, may be referred to as EVPN peer devices with respect to each other. In these illustrative configurations, the EVPN peer devices may exchange EVPN route information (e.g., hardware address reachability information) with one another over core network 8C. The EVPN route information (e.g., BGP messages containing the EVPN route information) may be exchanged based on any suitable underlying (transport layer and internet layer) protocol(s) that facilitate communication across underlay network 8C. The underlay network 8C (and the devices herein) may provide and implement underlying infrastructure over which the overlay VXLAN or MPLS network is implemented.

Figure 2:
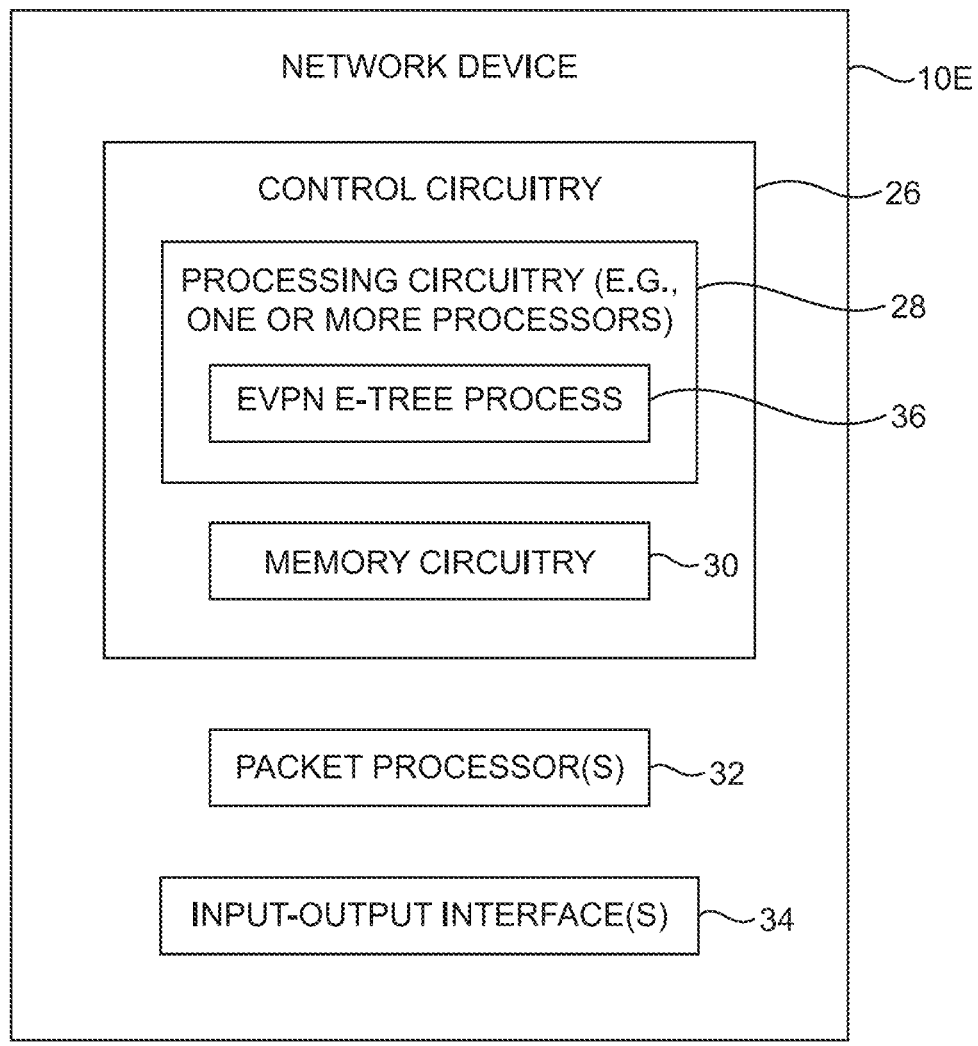
FIG. 2 is a diagram of an illustrative network device in accordance with some embodiments.

FIG. 2 is a diagram of an illustrative EVPN network device (e.g., edge network devices 10E-1, 10E-2, and/or 10E-3) configured to exchange EVPN route information with other EVPN peer devices. If desired, other network devices such as network devices 10C (FIG. 1), (customer) site edge devices, gateways for sites, spine switches for sites, leaf switches for sites, and/or other network devices connected to the edge network devices may have at least some (e.g., all) of the same components as the network device depicted in FIG. 2 but may omit execution of an EVPN process at the processing circuitry.

As shown in FIG. 2, network device 10E may include control circuitry 26 having processing circuitry 28 and memory circuitry 30, one or more packet processors 32, and input-output interfaces 34 disposed within a housing of network device 10E. In one illustrative arrangement, network device 10E may be or form part of a modular network device system (e.g., a modular switch system having removably coupled modules usable to flexibly expand characteristics and capabilities of the modular switch system such as to increase ports, provide specialized functionalities, etc.). In another illustrative arrangement, network device 10E may be a fixed-configuration network device (e.g., a fixed-configuration switch having a fixed number of ports and/or a fixed hardware configuration).

Processing circuitry 28 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Processing circuitry 28 may run (e.g., execute) a network device operating system and/or other software/firmware that is stored on memory circuitry 30. Memory circuitry 30 may include non-transitory (tangible) computer readable storage media that stores the operating system software and/or any other software code, sometimes referred to as program instructions, software, data, instructions, or code. As an example, the EVPN routing functions performed by network device 10E described herein may be stored as (software) instructions on the non-transitory computer-readable storage media (e.g., in portion(s) of memory circuitry 30 in network device 10E). The corresponding processing circuitry (e.g., one or more processors of processing circuitry 28 in network device 10E) may process or execute the respective instructions to perform the corresponding EVPN routing functions. Memory circuitry 30 may be implemented using non-volatile memory (e.g., flash memory or other electrically-programmable read-only memory configured to form a solid-state drive), volatile memory (e.g., static or dynamic random-access memory), hard disk drive storage, removable storage devices (e.g., storage device removably coupled to device 10E), and/or other storage circuitry. Processing circuitry 28 and memory circuitry 30 as described above may sometimes be referred to collectively as control circuitry 26 (e.g., implementing a control plane of network device 10E).

As just a few examples, processing circuitry 28 may execute network device control plane software such as operating system software, routing policy management software, routing protocol agents or processes (e.g., EVPN and E-tree (Ethernet-tree) service process 36), routing information base agents, and other control software, may be used to support the operation of protocol clients and/or servers (e.g., to form some or all of a communications protocol stack), may be used to support the operation of packet processor(s) 32, may store packet forwarding information, may execute packet processing software, and/or may execute other software instructions that control the functions of network device 10E and the other components therein.

Packet processor(s) 32 may be used to implement a data plane or forwarding plane of network device 10E. Packet processor(s) 32 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Packet processor 32 may receive incoming network traffic via input-output interfaces 34, parse and analyze the received network traffic, process the network traffic based on packet forwarding decision data (e.g., in a forwarding information base) and/or in accordance with network protocol(s) or other forwarding policy, and forward (or drop) the network traffic accordingly. The packet forwarding decision data may be stored on a portion of memory circuitry 30 and/or other memory circuitry integrated as part of or separate from packet processor 32.

Input-output interfaces 34 may include different types of communication interfaces such as Ethernet interfaces (e.g., one or more Ethernet ports), optical interfaces, a Bluetooth interface, a Wi-Fi interface, and/or other networking interfaces for connecting network device 10E to the Internet, a local area network, a wide area network, a mobile network, and generally other network device(s), peripheral devices, and other computing equipment (e.g., host equipment such as server equipment, user equipment, etc.). As an example, input-output interfaces 34 may include ports or sockets to which corresponding mating connectors of external components can be physically coupled and electrically connected. Ports may have different form-factors to accommodate different cables, different modules, different devices, or generally different external equipment.

Configuration in which some network devices in network 8 (e.g., network devices 10E) provide EVPN and E-tree service over EVPN (e.g., using respective process 36 executing on corresponding processing circuitry of that network device) are sometimes described herein as an illustrative example. EVPN process 36 may manage and facilitate operations of EVPN such as the exchange of EVPN route information with other peer devices and the handling of exchanged information. The E-tree service portion of process 36 may help implement an E-tree configuration by providing root or leaf attributes to (attachment circuit) interfaces and handling traffic therebetween to facilitate appropriate isolation.

Figure 3:
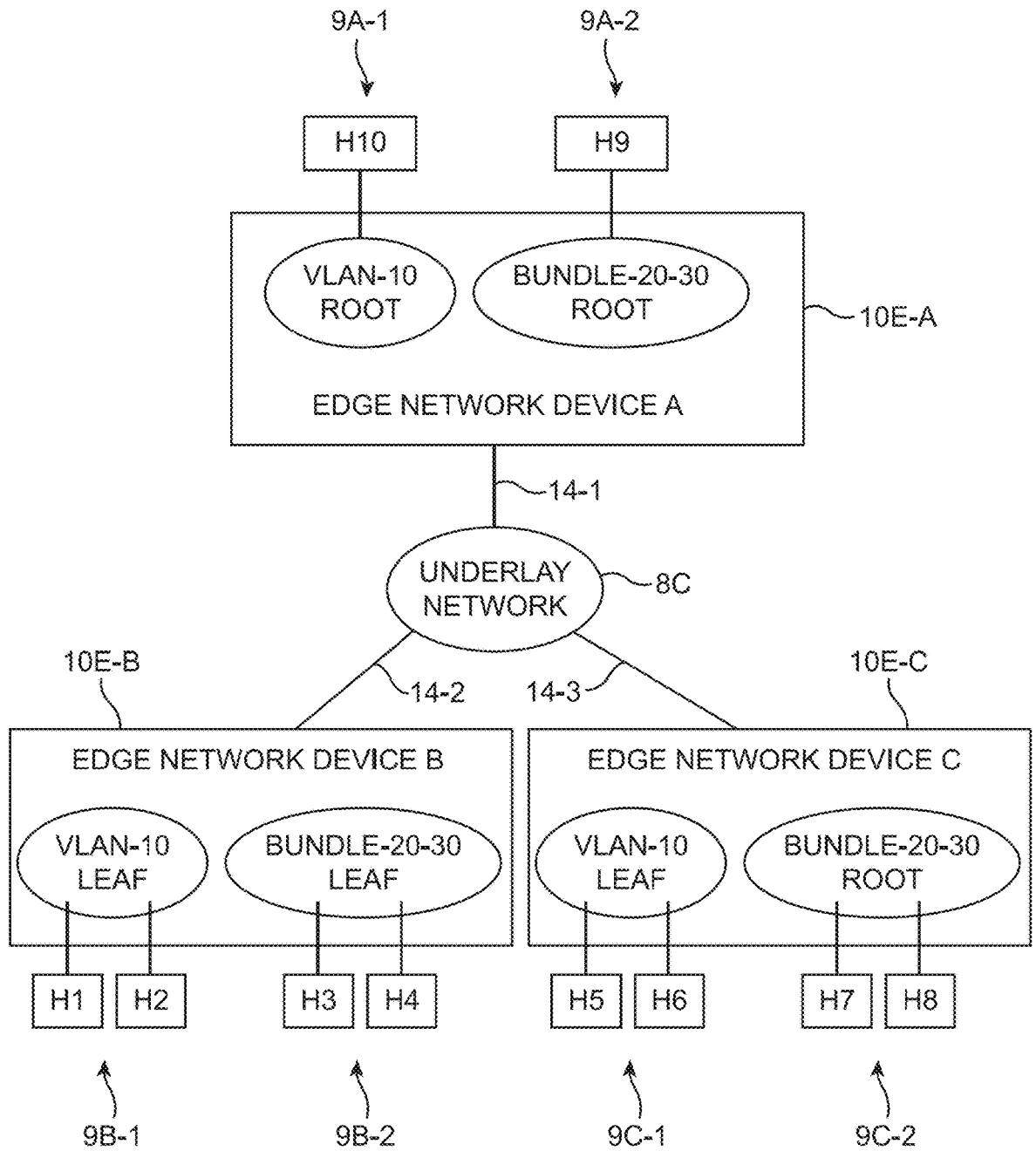
FIG. 3 is a diagram of an illustrative network configuration with edge network devices conveying EVPN routing information across an underlay network in accordance with some embodiments.

FIG. 3 shows an illustrative network configuration having network devices 10E-A, 10E-B, and 10E-C that implement an EVPN E-tree service. In particular, edge network devices 10E-A, 10E-B, and 10E-C may each execute an EVPN E-tree service process 36 (e.g., executing on corresponding processing circuitry 28 of device 10E of FIG. 2). In configurations described herein as an example, edge network devices 10E-A, 10E-B, and 10E-C may correspond to (e.g., be implemented as) edge network devices 10E-1, 10E-2, and 10E-3, respectively.

Edge devices 10E-A, 10E-B, and 10E-C may provide one or more EVPN instances that are attached to root and/or leaf sites (e.g., customer sites containing corresponding customer edge network devices and customer hosts). Each EVPN instance can contain one or more Layer 2 (L2) broadcast domains (e.g., VLANs). Leaf or root site designations or classifications may be provided on a per (provider) edge device basis, may be provided on a per attachment circuit (e.g., per VLAN) basis, and/or may be provided on a per host (e.g., per MAC address) basis.

In the example of FIG. 3, edge devices 10E-A, 10E-B, and 10E-C are configured to implement two illustrative EVPN instances such as a first EVPN instance based on a VLAN based service for a VLAN (e.g., VLAN-10) and a second EVPN instance based on a VLAN bundle based service (e.g., a VLAN aware bundle service) for a VLAN bundle containing multiple VLANs (e.g., VLAN-20 and VLAN-30).

To provide the first EVPN instance, edge network device 10E-A may be attached (e.g., via a root attachment circuit) to root site 9A-1 containing one or more end hosts such as host H10 for a first VLAN such as VLAN-10 configured on device 10E-A. Root site 9A-1 may include additional intervening network devices such as a customer edge network device between device 10E-A and its end hosts such as host H10. Root site 9A-1 (e.g., its end hosts and any intervening network devices) may sometimes be referred to as a root attachment circuit at edge device 10E-A for the first EVPN instance.

To provide the second EVPN instance, edge network device 10E-A may be attached (e.g., via a root attachment circuit) to root site 9A-2 containing one or more end hosts such as host H9 for a VLAN(-aware) bundle such as VLAN bundle-20-30 (e.g., containing a second VLAN such as VLAN-20 and a third VLAN such as VLAN-30) configured on device 10E-A. As an example, root site 9A-2 (e.g., its hosts such as host H9) may belong to one of VLAN-20 or VLAN-30, whereas another (root or leaf) site (not explicitly shown in FIG. 3) may belong to the other one of VLAN-20 or VLAN-30 for the same second EVPN instance. Root site 9A-2 may include additional intervening network devices such as a customer edge network device between device 10E-A and its end hosts such as host H9. Root site 9A-2 (e.g., its end hosts and any intervening network devices) may sometimes be referred to as a root attachment circuit at edge device 10E-A for the second EVPN instance, whereas the other (root or leaf) site (not explicitly shown in FIG. 3) may sometimes be referred to as another (root or leaf) attachment circuit at edge device 10E-A for the second EVPN instance.

To provide the first EVPN instance, edge network device 10E-B may be attached (e.g., via a leaf attachment circuit) to leaf site 9B-1 containing one or more end hosts such as hosts H1 and H2 for VLAN-10 configured on device 10E-B. Leaf site 9B-1 may include additional intervening network devices such as a customer edge network device between device 10E-B and its end hosts such as hosts H1 and H2.

Leaf site 9B-1 (e.g., its end hosts and any intervening network devices) may sometimes be referred to as a leaf attachment circuit at edge device 10E-B for the first EVPN instance.

To provide the second EVPN instance, edge network device 10E-B may be attached (e.g., via a leaf attachment circuit) to leaf site 9B-2 containing one or more end hosts such as hosts H3 and H4 for VLAN bundle-20-30 configured on device 10E-B. As an example, leaf site 9B-2 (e.g., its hosts such as host H3 and H4) may belong to one of VLAN-20 or VLAN-30, whereas another (root or leaf) site (not explicitly shown in FIG. 3) may belong to the other one of VLAN-20 or VLAN-30 for the same second EVPN instance. Leaf site 9B-2 may include additional intervening network devices such as a customer edge network device between device 10E-B and its end hosts such as hosts H3 and H4. Leaf site 9B-2 (e.g., its end hosts and any intervening network devices) may sometimes be referred to as a leaf attachment circuit at edge device 10E-B for the second EVPN instance, whereas the other (root or leaf) site (not explicitly shown in FIG. 3) may sometimes be referred to as another (root or leaf) attachment circuit at edge device 10E-B for the second EVPN instance.

To provide the first EVPN instance, edge network device 10E-C may be attached (e.g., via a leaf attachment circuit) to leaf site 9C-1 containing one or more end hosts such as hosts H5 and H6 for VLAN-10 configured on device 10E-C. Leaf site 9C-1 may include additional intervening network devices such as a customer edge network device between device 10E-C and its end hosts such as hosts H5 and H6. Leaf site 9C-1 (e.g., its end hosts and any intervening network devices) may sometimes be referred to as a leaf attachment circuit at edge device 10E-C for the first EVPN instance.

To provide the second EVPN instance, edge network device 10E-C may be attached (e.g., via a root attachment circuit) to root site 9C-2 containing one or more end hosts such as hosts H7 and H8 for VLAN bundle-20-30 configured on device 10E-C. As an example, root site 9C-2 (e.g., its hosts such as host H7 and H8) may belong to one of VLAN-20 or VLAN-30, whereas another (root or leaf) site (not explicitly shown in FIG. 3) may belong to the other one of VLAN-20 or VLAN-30 for the same second EVPN instance. Root site 9C-2 may include additional intervening network devices such as a customer edge network device between device 10E-C and its end hosts such as hosts H7 and H8. Root site 9C-2 (e.g., its end hosts and any intervening network devices) may sometimes be referred to as a root attachment circuit at edge device 10E-C for the second EVPN instance, whereas the other (root or leaf) site (not explicitly shown in FIG. 3) may sometimes be referred to as another (root or leaf) attachment circuit at edge device 10E-C for the second EVPN instance.

While the sites coupled to edge network devices 10E-A, 10E-B, and 10E-C are shown in FIG. 3 to contain only hosts, this is merely illustrative. If desired, these sites may include network devices (e.g., gateways, routers, switches, and/or other suitable types of network devices) coupled between edge devices (e.g., devices 10E-A, 10E-B, and 10E-C) and corresponding hosts (e.g., hosts H1-H10). In other words, in some illustrative configurations, elements H1-H10 may each be a corresponding (customer) edge network device behind which one or more corresponding hosts for respective sites are located.

While in the example in FIG. 3 all attachment circuits for the second EVPN instance associated with VLAN bundle-20-30 (e.g., a VLAN-aware bundle) at each edge network device is shown to have the same root or leaf classification, this is merely illustrative. If desired, attachment circuit(s) for the second EVPN instance at each edge network device may have mixed root and leaf classifications (e.g., some VLANs in the VLAN bundle at a given edge network device are associated with root site(s), while other VLANs in the VLAN bundle at the given edge network device are associated with leaf site(s)). The embodiments with respect to EVPN E-tree traffic handling described herein can similarly apply to network configurations containing one or both types of VLAN bundles (e.g., a VLAN bundle with all attachment circuit(s) of the same root or leaf classification and/or a VLAN bundle with attachment circuits of mixed root and leaf classifications).

In order to facilitate forwarding of traffic for EVPN E-tree (service) while enforcing appropriate isolation between different leaf and root sites, EVPN routes may be advertised over underlay network 8C (e.g., an underlay network implementing an MPLS or VXLAN overlay). Configurations in which underlay network 8C implements VXLAN are sometimes described herein as an illustrative example.

While known unicast traffic forwarding for EVPN E-tree may be implemented using ingress filtering (e.g., on the ingress-side of the tunnel over the overlay network), BUM (broadcast, unknown unicast, and/or multicast) traffic forwarding for EVPN E-tree is handled by egress filtering (e.g., on the egress-side of the tunnel over the overlay network) for an underlay network implementing an MPLS overlay.

It may be desirable to provide BUM traffic forwarding for EVPN E-tree using ingress filtering (e.g., to reduce overlay network traffic) and/or over an underlay network implementing VXLAN (e.g., to provide EVPN E-tree over VXLAN infrastructure implementing an VXLAN overlay over network 8C). To enable EVPN E-tree network devices such as edge devices 10E-A, 10E-B, and 10E-C(FIG. 3) to perform BUM traffic forwarding using ingress filtering, EVPN peer devices may advertise EVPN type-3 (Inclusive Multicast Ethernet Tag or IMET) routes that each contain an indication of leaf or root attachment of the advertised route.

Figure 4:
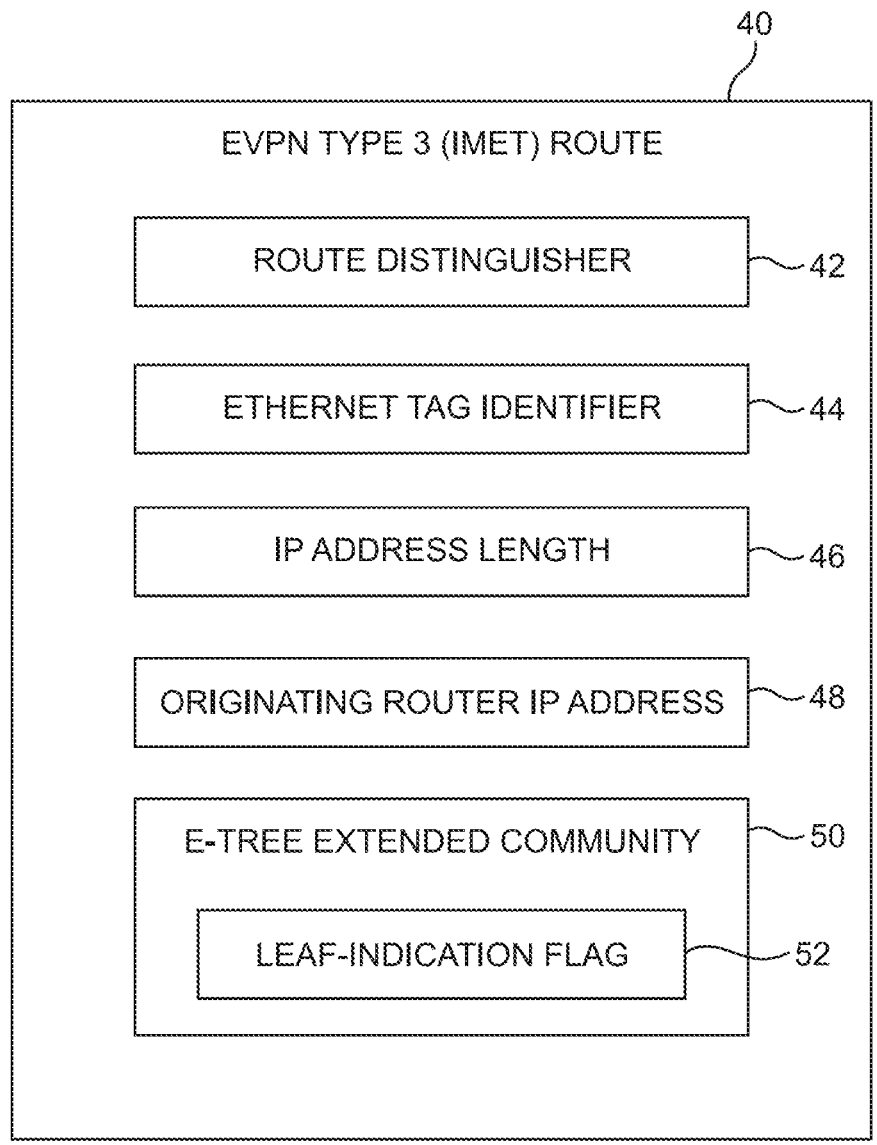
FIG. 4 is a diagram of an illustrative EVPN type-3 (IMET) route having an E-tree extended community with a leaf-indication flag in accordance with some embodiments.

FIG. 4 is a diagram of an illustrative EVPN type-3 IMET route advertisement message such as message 40. EVPN type-3 IMET route advertisement message 40 may include a route distinguisher 42, an Ethernet tag identifier 44, an IP address length 46, and an originating router's IP address 48. EVPN type-3 IMET route advertisement message 40 may further include an E-tree extended community 50 containing a leaf-indication flag (bit) 52 that can be set (e.g., having a binary value of '1') or cleared (e.g., having a binary value of '0'). The presence of E-tree extended community 50 and/or leaf-indication flag 52 being set in EVPN type-3 IMET route advertisement message 40 can be indicative of the VXLAN virtual network identifier (VNI) (e.g., identifying the corresponding VLAN) in the advertised message 40 being for (e.g., associated with, attached to, etc.) a leaf site. The absence of E-tree extended community 50 and/or leaf-indication flag 52 being cleared in an EVPN type-3 IMET route advertisement message can be indicative of the VNI (e.g., the corresponding VLAN) in the advertised message being for (e.g., associated with, attached to, etc.) a root site. E-tree extended community 50 can be an E-tree extended community as defined or generally described in RFC (Request for Comments) 8317, if desired.

If desired, instead of or in addition to leaf-indication flag 52, E-tree extended community 50 and/or other fields in EVPN type-3 IMET route advertisement message 40 may include other types of indicators of leaf or root designations for a corresponding advertised site (e.g., indicated by a corresponding identifier such as a VNI for the VLAN of the site). As one example, E-tree extended community 50 may include a root-indication flag to indicate an association with a root site when set. In general, E-tree extended community 50 may contain any suitable information for providing E-tree service (e.g., in addition to leaf-indication flag 52).

In order to not obscure the embodiments of FIGS. 5-10, the physical network paths coupling one or more pairs of network devices as shown in FIGS. 1 and 3 have been omitted from FIGS. 5-10. In general, pair(s) of network devices may each communicate (e.g., routing advertisement messages, production traffic, and/or other types of traffic) therebetween via any suitable network path(s) such as those described in connection with FIGS. 1 and 3 (e.g., using the network paths within each site, using network paths between different sites such as those in network 8C, etc.).

Figure 5:
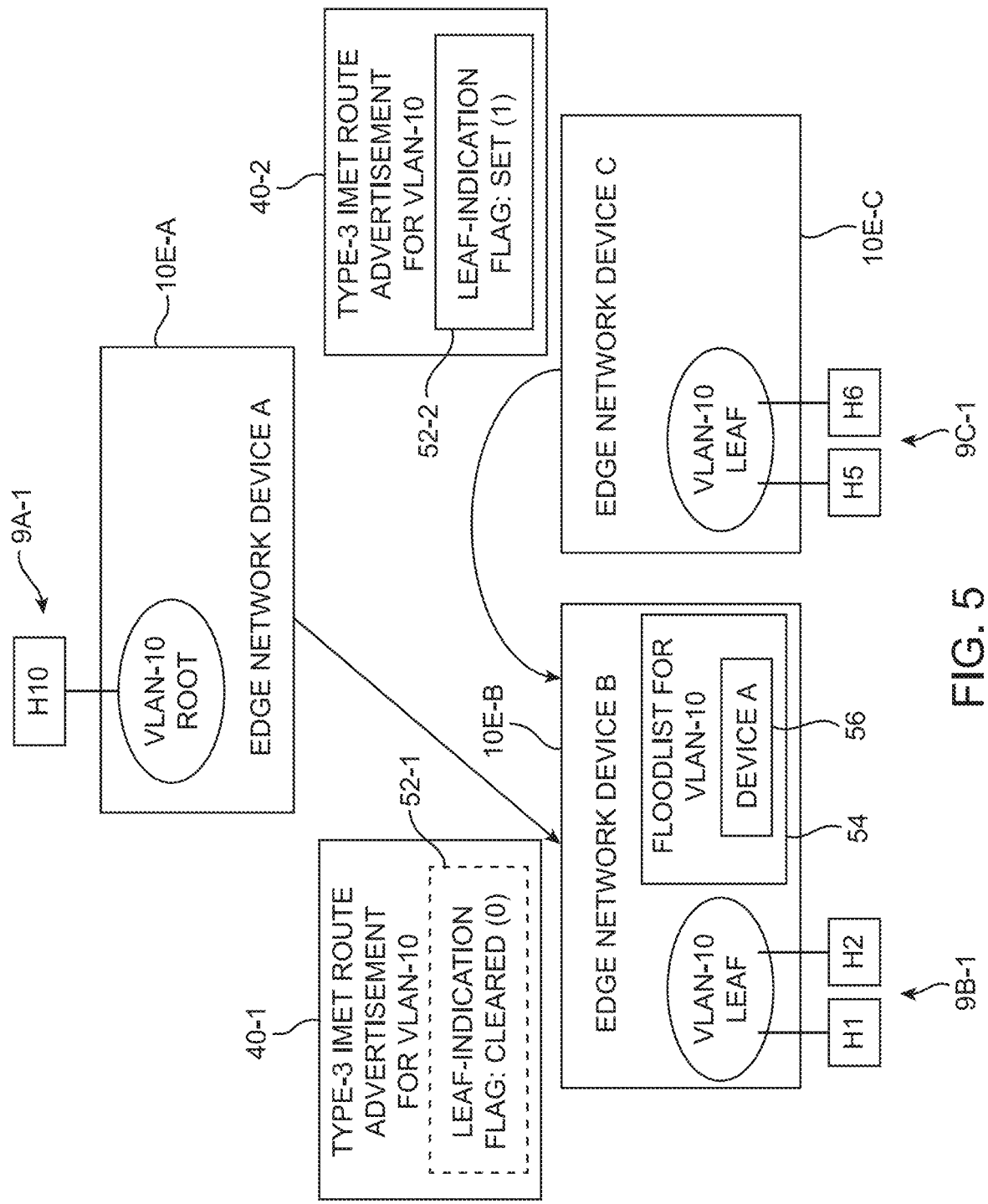
FIG. 5 is a diagram of illustrative EVPN type-3 routes being advertised between edge network devices to generate a floodlist at an edge network device in accordance with some embodiments.

FIG. 5 shows a network device such as edge network device 10E-B (FIG. 3) that receives illustrative EVPN type-3 IMET route advertisement messages (e.g., of the same type or format as message 40 shown in FIG. 4) and uses the received message to form a floodlist. As an example, the floodlist may be maintained and stored on memory circuitry at the network device (e.g., memory circuitry 30 in FIG. 2). In one illustrative application or configuration described herein as an example, the network device may use the maintained floodlist to facilitate forwarding of BUM traffic for EVPN E-tree using ingress filtering at the network device.

In the example of FIG. 5, device 10E-B receives EVPN type-3 IMET route advertisement messages for VLAN-10 (e.g., for the EVPN instance associated with VLAN-10). In particular, device 10E-B implements (e.g., is configured with) VLAN-10 and is attached to leaf site 9B-1 for VLAN-10. Device 10E-B may receive EVPN type-3 IMET route advertisement message 40-1 for VLAN-10 (e.g., containing a VNI corresponding to VLAN-10) from device 10E-A that lacks an E-tree extended community (e.g., E-tree extended community 50 in FIG. 4) and/or that includes leaf-indication flag 52-1 with a cleared value such as bit '0' (e.g., in scenarios where E-tree extended community 50 for message 40-1 is present). Based on EVPN type-3 IMET route advertisement message 40-1 for VLAN-10 from device 10E-A (e.g., indicating that the EVPN instance for VLAN-10 at device 10E-A is attached to root site 9A-1), device 10E-B may update a floodlist 54 for VLAN-10 to include an entry 56 indicating device 10E-A (e.g., entry 56 includes an identifier for device 10E-A).

Device 10E-B may receive EVPN type-3 IMET route advertisement message 40-2 for VLAN-10 (e.g., containing the VNI corresponding to VLAN-10) from device 10E-C that includes an E-tree extended community (e.g., E-tree extended community 40 in FIG. 4) and/or that includes leaf-indication flag 52-2 with a set value such as bit '1' (e.g., in a corresponding E-tree extended community for message 40-2). Based on EVPN type-3 IMET route advertisement message 40-2 for VLAN-10 from device 10E-C(e.g., indicating that the EVPN instance for VLAN-10 at device 10E-C is attached to leaf site 9C-1), device 10E-B may keep floodlist 54 for VLAN-10 from containing an entry indicating device 10E-C.

In other words, device 10E-C(e.g., an identifier for device 10E-C) is absent from floodlist 54 for VLAN-10 even after reception and processing of EVPN type-3 IMET route advertisement message 40-2 from device 10E-C, whereas device 10E-A (e.g., an identifier for device 10E-A) is added to floodlist 54 (e.g., in entry 56) after reception and processing of EVPN type-3 IMET route advertisement message 40-1 from device 10E-A. In such a manner, device 10E-B (e.g., processing circuitry 28 at device 10E-B) may optionally or selectively update (e.g., add or not add) remote edge devices to its floodlist(s) based on EVPN type-3 IMET route advertisement message 40 received from the remote edge devices. Each message 40 may be received on a per-VNI or VLAN basis from each remote edge device.

While, in the example described in connection with FIG. 5 and in the examples generally described herein, information is conveyed, stored, and/or generally identified by VLAN (e.g., VLAN-10 in FIG. 5), this is merely illustrative. The VNI corresponding to the VLAN may be used instead of or in addition to the VLAN for conveyance, storage, and/or identification of the corresponding information (e.g., in floodlists, in EVPN type-3 IMET messages, on EVPN tables, etc.).

Figure 6:
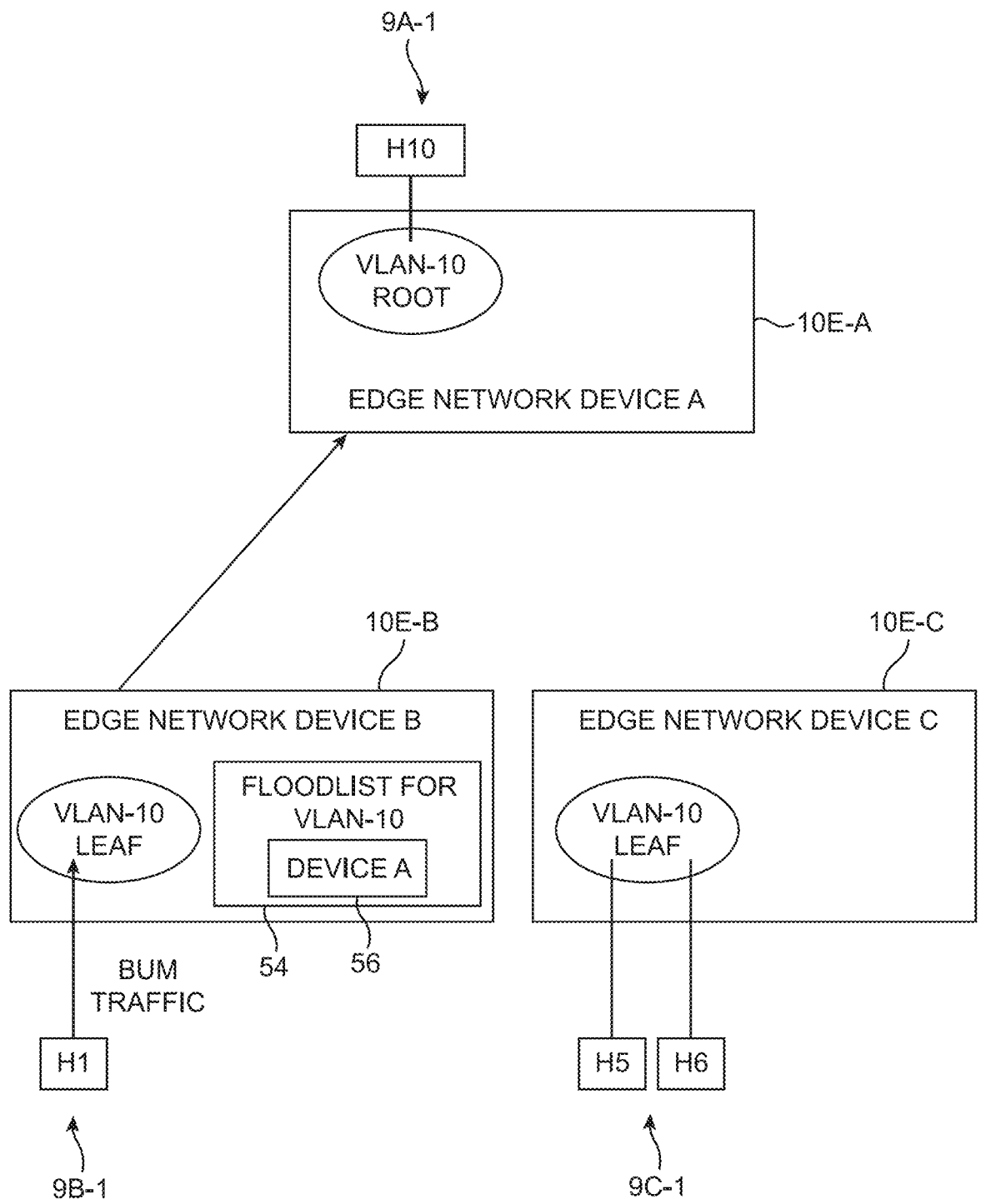
FIG. 6 is a diagram of illustrative ingress filtering of BUM traffic based on a floodlist in accordance with some embodiments.

FIG. 6 shows a network device such as network device 10E-B that provides illustrative forwarding of BUM traffic for EVPN E-tree (service) using ingress filtering based on a floodlist maintained at the network device such as floodlist 54 maintained at network device 10E-B. In the example of FIG. 6, BUM traffic sourced from host H1 or generally from leaf site 9B-1 may be forwarded to edge network device 10E-B. Device 10E-B (e.g., packet processor 32 at device 10E-B) may obtain and use maintained floodlist 54 for VLAN-10 to handle the BUM traffic by flooding the BUM traffic only to remote edge devices identified as being in floodlist 54. As shown in FIG. 6, BUM traffic from host H1 or generally from leaf site 9B-1 may be flooded to device 10E-A (and subsequently forwarded from device 10E-A to hosts in root site 9A-1) but not to device 10E-C(or to leaf site 9C-1) because device 10E-A is identified in entry 56 and is on floodlist 54 but device 10E-C is not. If desired, the identifier of 10E-A at entry 56 may be used to process the BUM traffic (e.g., may be used to encapsulate the traffic, used as a lookup key in the packet processing pipeline when processing the traffic, and/or generally accessed during packet processing operations of the traffic as performed by packet processor 32 at device 10E-B). This behavior provides the desired isolation between leaf and leaf sites (e.g., from site 9B-1 to site 9C-1) while providing forwarding from leaf to root sites (e.g., from site 9B-1 to site 9A-1).

If desired, an edge network device such as device 10E-B may use the type of floodlist described in connection with FIG. 6 (e.g., floodlist 54) to provide some desired known unicast forwarding behavior (e.g., in addition to or instead of the BUM traffic forwarding behavior described in connection with FIG. 6). In particular, FIG. 7 shows a network device such as network device 10E-B that provides illustrative forwarding of known unicast traffic from one leaf site to another leaf site using a floodlist such as floodlist 54.

Figure 7:
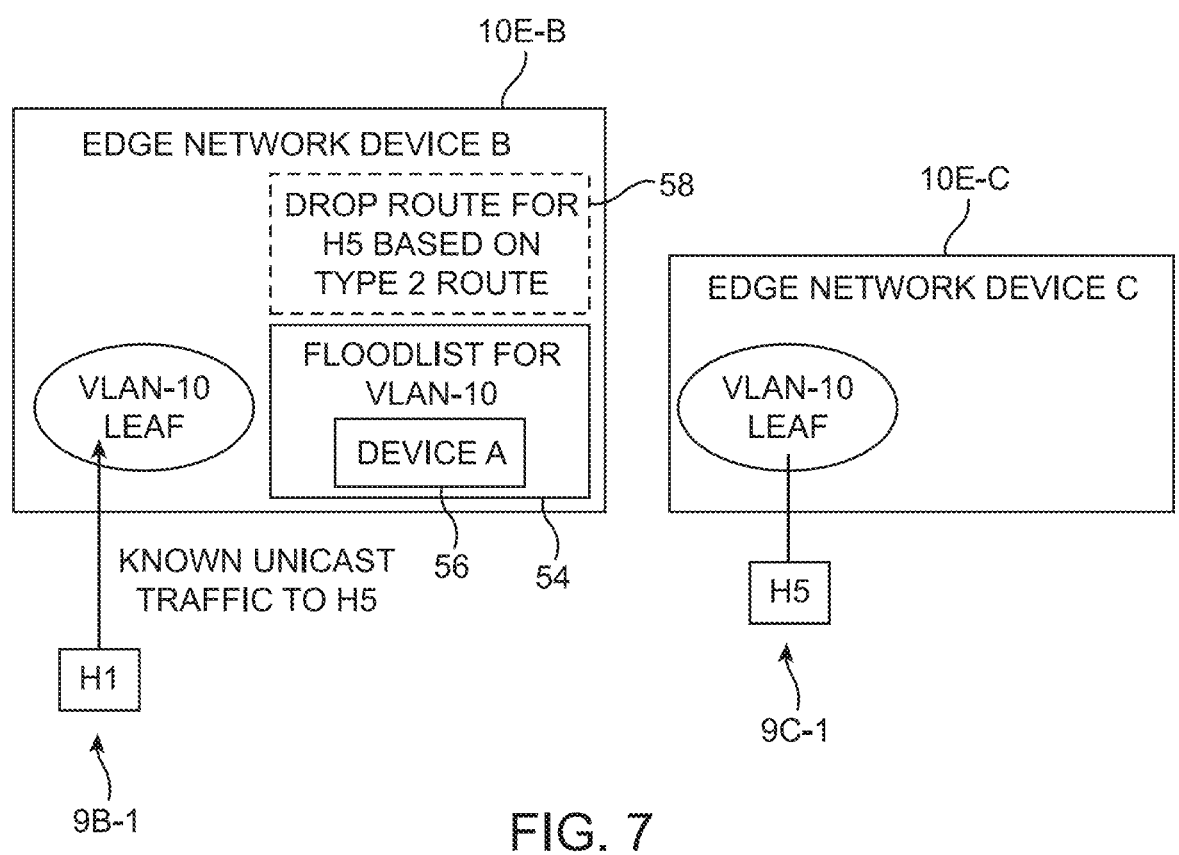
FIG. 7 is a diagram of illustrative ingress filtering of known unicast traffic based on a floodlist in accordance with some embodiments.

As shown in FIG. 7, network device 10E-B may receive known unicast traffic from host H1 (e.g., a host in leaf site 9B-1 for the EVPN instance of VLAN-10) destined for host H5 (e.g., a host in leaf site 9C-1 for the EVPN instance of VLAN-10 attached to device 10E-C). Network device 10E-B (e.g., packet processor 32 at device 10E-B) may access or otherwise reference floodlist 54 for VLAN-10 to make a forwarding decision on the received known unicast traffic. In particular, network device 10E-B may determine (e.g., based on one or more entries in floodlist 54) device 10E-C to which destination host H5 is attached is not on floodlist 54. Based on this determination, network device 10E-B (e.g., packet processor 32 at device 10E-B) may drop the received known unicast traffic. By using floodlist 54 to provide traffic drop behavior (e.g., for unicast traffic between leaf sites), device 10E-B (e.g., processing circuitry 28 at device 10E-B) may omit the extraneous installation of a drop route 58 for host H5 that would otherwise be installed based on the reception and processing of an EVPN type-2 (MAC-IP) route advertisement message from device 10E-C (e.g., with an E-tree extended community in the message indicating a leaf-tagged route). In a similar manner, network device 10E-B may also omit the installation of other drop routes for remote leaf site hosts based on their advertised unicast leaf-tagged routes).

Figure 8:
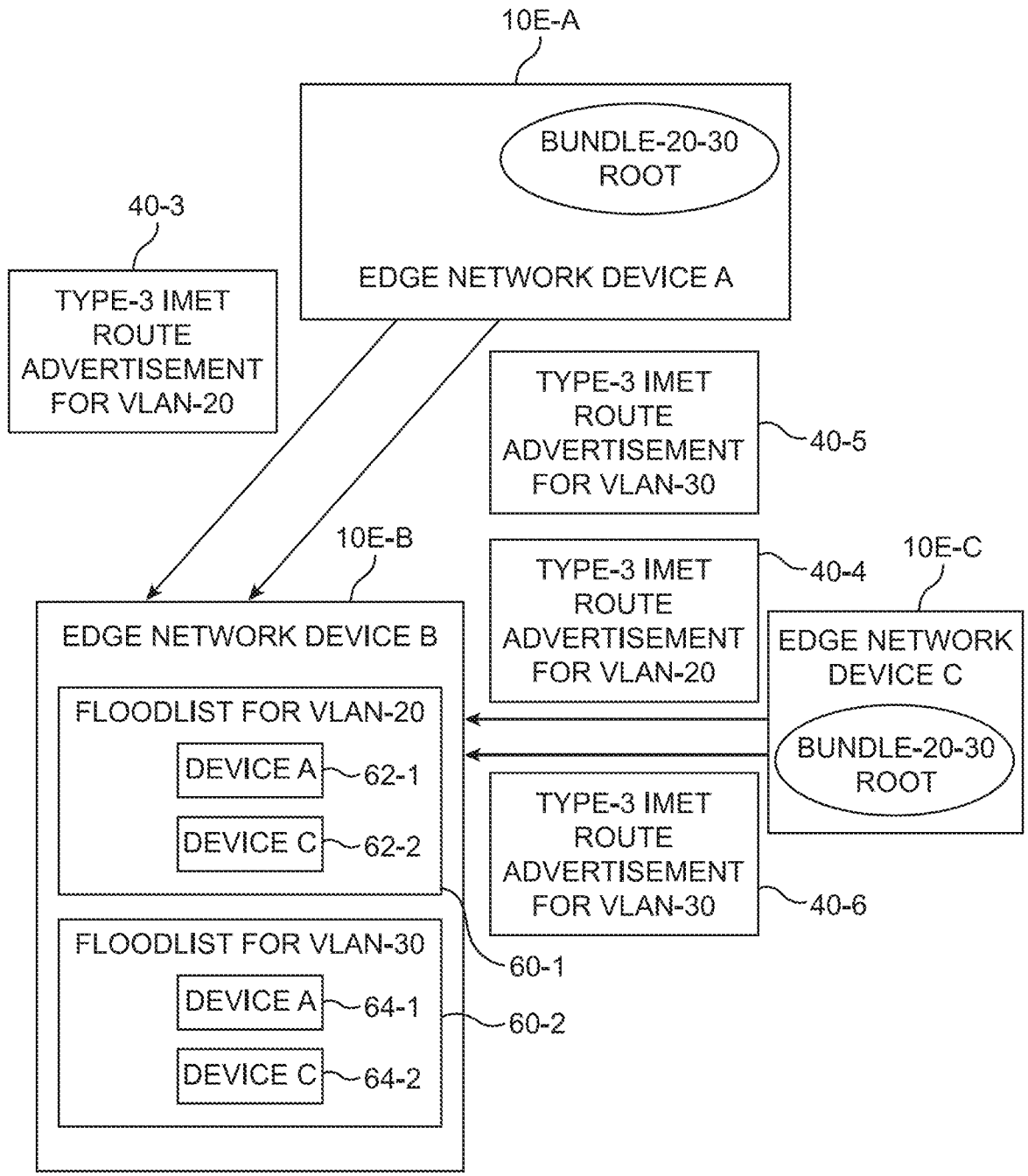
FIG. 8 is a diagram of illustrative EVPN type-3 routes being advertised for VLAN bundles in accordance with some embodiments.

The advertisement of EVPN type-3 IMET routes may be performed on a per-VLAN or per-VNI basis. FIG. 8 shows some illustrative network devices advertising multiple illustrative EVPN type-3 IMET routes for a VLAN bundle containing multiple VLANs (e.g., VLAN bundle-20-30 containing VLAN-20 and VLAN-30). Because VLAN bundle-20-30 for device 10E-A and VLAN bundle-20-30 for device 10E-C for the same EVPN instance are attached to root sites, each of the four EVPN type-3 IMET routes advertised by devices 10E-A and 10E-C in messages 40 (referring to messages 40-3, 40-4, 40-5, and 40-6, collectively) lacks the E-tree extended community (e.g., E-tree extended community 50 in FIG. 4) and/or includes a leaf-indication flag (e.g., flag 52 in FIG. 4) having a cleared value (e.g., in the E-tree extended community that is present).

Device 10E-B (e.g., processing circuitry 28 at device 10E-B) may populate a first floodlist 60-1 for a first VLAN VLAN-20 of the VLAN bundle to contain an indication of device 10E-A based on the received device-10E-A-advertised EVPN IMET route for VLAN-20 (e.g., in message 40-3) indicating attachment to a root site (e.g., with a cleared leaf-indication flag in message 40-4). As an example, device 10E-B may generate an entry 62-1 in floodlist 60-1 that contains an identifier for device 10E-A. If desired, the identifier of device 10E-A at entry 62-1 may be used to process BUM or unicast traffic (e.g., may be used to encapsulate the traffic, used as a lookup key in the packet processing pipeline when processing the traffic, and/or generally accessed during packet processing operations of the traffic as performed by packet processor 32 at device 10E-B).

Device 10E-B (e.g., processing circuitry 28 at device 10E-B) may populate floodlist 60-1 to contain an indication of device 10E-C based on the received device-10E-C-advertised EVPN IMET route for VLAN-20 (e.g., in message 40-4) indicating attachment to a root site (e.g., with a cleared leaf-indication flag in message 40-4). As an example, device 10E-B may generate an entry 62-2 in floodlist 60-1 that contains an identifier for device 10E-C. If desired, the identifier of device 10E-C at entry 62-2 may be used to process BUM or unicast traffic (e.g., may be used to encapsulate the traffic, used as a lookup key in the packet processing pipeline when processing the traffic, and/or generally accessed during packet processing operations of the traffic as performed by packet processor 32 at device 10E-B).

Device 10E-B (e.g., processing circuitry 28 at device B) may populate a second floodlist 60-2 for a second VLAN VLAN-30 of the VLAN bundle to contain an indication of device 10E-A based on the received device-10E-A-advertised EVPN IMET route for VLAN-30 (e.g., in message 40-5) indicating attachment to a root site (e.g., with a cleared leaf-indication flag in message 40-5). As an example, device 10E-B may generate an entry 64-1 in floodlist 60-2 that contains an identifier for device 10E-A. If desired, the identifier of device 10E-A at entry 64-1 may be used to process BUM or unicast traffic (e.g., may be used to encapsulate the traffic, used as a lookup key in the packet processing pipeline when processing the traffic, and/or generally accessed during packet processing operations of the traffic as performed by packet processor 32 at device 10E-B).

Device 10E-B (e.g., processing circuitry 28 at device 10E-B) may populate floodlist 60-2 to contain an indication of device 10E-C based on the received device-10E-C-advertised EVPN IMET route for VLAN-30 (e.g., in message 40-6) indicating attachment to a root site (e.g., with a cleared leaf-indication flag in message 40-6). As an example, device 10E-B may generate an entry 64-2 in floodlist 60-2 that contains an identifier for device 10E-C. If desired, the identifier of device 10E-C at entry 64-2 may be used to process BUM or unicast traffic (e.g., may be used to encapsulate the traffic, used as a lookup key in the packet processing pipeline when processing the traffic, and/or generally accessed during packet processing operations of the traffic as performed by packet processor 32 at device 10E-B).

Accordingly, BUM traffic from the leaf site for VLAN-20 in VLAN bundle-20-30 attached to device 10E-B (e.g., sourced from hosts in VLAN-20) may be flooded to both devices 10E-A and 10E-C based on floodlist 60-1 for VLAN-20. BUM traffic from the leaf site for VLAN-30 in VLAN bundle-20-30 attached to device 10E-B (e.g., sourced from hosts in VLAN-30) may be flooded to both devices 10E-A and 10E-C based on floodlist 60-2 for VLAN-30. Packet processor 32 at device 10E-B may process BUM traffic (and/or in some scenarios known unicast traffic) based on floodlist 60-1 and 60-2 in a similar manner as described in connection with FIGS. 6 and 7.

If desired, floodlists 60-1 and 60-2 for VLAN-20 and VLAN-30 may be consolidated to form a floodlist for VLAN bundle-20-30. In other arrangements, one or more VLAN bundles may each contain VLANs attached to both leaf and root sites. In these other arrangements, floodlists for different VLANs of each VLAN bundle should be kept separate (e.g., one floodlist is maintained for each VLAN of each VLAN bundle).

If desired, the ingress filtering scheme for handling traffic (e.g., BUM traffic) described in connection with FIGS. 3-8 may be applied to an underlay network implementing MPLS infrastructure. EVPN type-3 IMET routes are advertised per-identifier. In configurations where the underlying network implements VXLAN (e.g., contains devices that process VXLAN headers), the identifier may be a VNI that is assigned per-VLAN. In configurations where the underlying network implements MPLS (e.g., contains devices that process MPLS labels), the identifier may be an MPLS label that is assigned per-MAC-VRF (MAC Virtual Routing and Forwarding) instance. Accordingly, for a bundle MAC-VRF instance (containing multiple VLANs), only a single IMET route is advertised (e.g., in message 40 in FIG. 4). In some arrangements (e.g., where the bundle MAC-VRF instance contains VLANs attached to both leaf and root sites), the single per-MAC-VRF-advertised IMET route can only indicate leaf or root for the entire bundle MAC-VRF instance (e.g., using e-tree extended community 50 and/or leaf-indication flag 52 in message 40 as described in connection with FIG. 4), which would lead to incorrect traffic forwarding behavior for E-tree. In other arrangements (e.g., where the bundle MAC-VRF instance contains VLANs attached to only leaf site(s) or only root site(s)), the single per-MAC-VRF-advertised IMET route (e.g., leaf-indication flag 50 in message 40) can properly indicate attachment to leaf site(s) or root site(s). Accordingly, the embodiments described in connection with FIGS. 3-8 may similarly be employed for an MPLS overlay network (e.g., implemented on underlay network 8C).

While FIGS. 3-8 as described above illustrate handling of BUM traffic using ingress replication (e.g., as described in connection with edge network device 10E-B in the examples of FIGS. 5, 6, and 8), this is merely illustrative. If desired, the advertisement of EVPN IMET routes in messages 40 of the type shown in FIG. 4 may help facilitate multicast replication for handling BUM traffic for EVPN E-tree service.

E-Tree Service Via Multicast Group Membership

Figure 9:
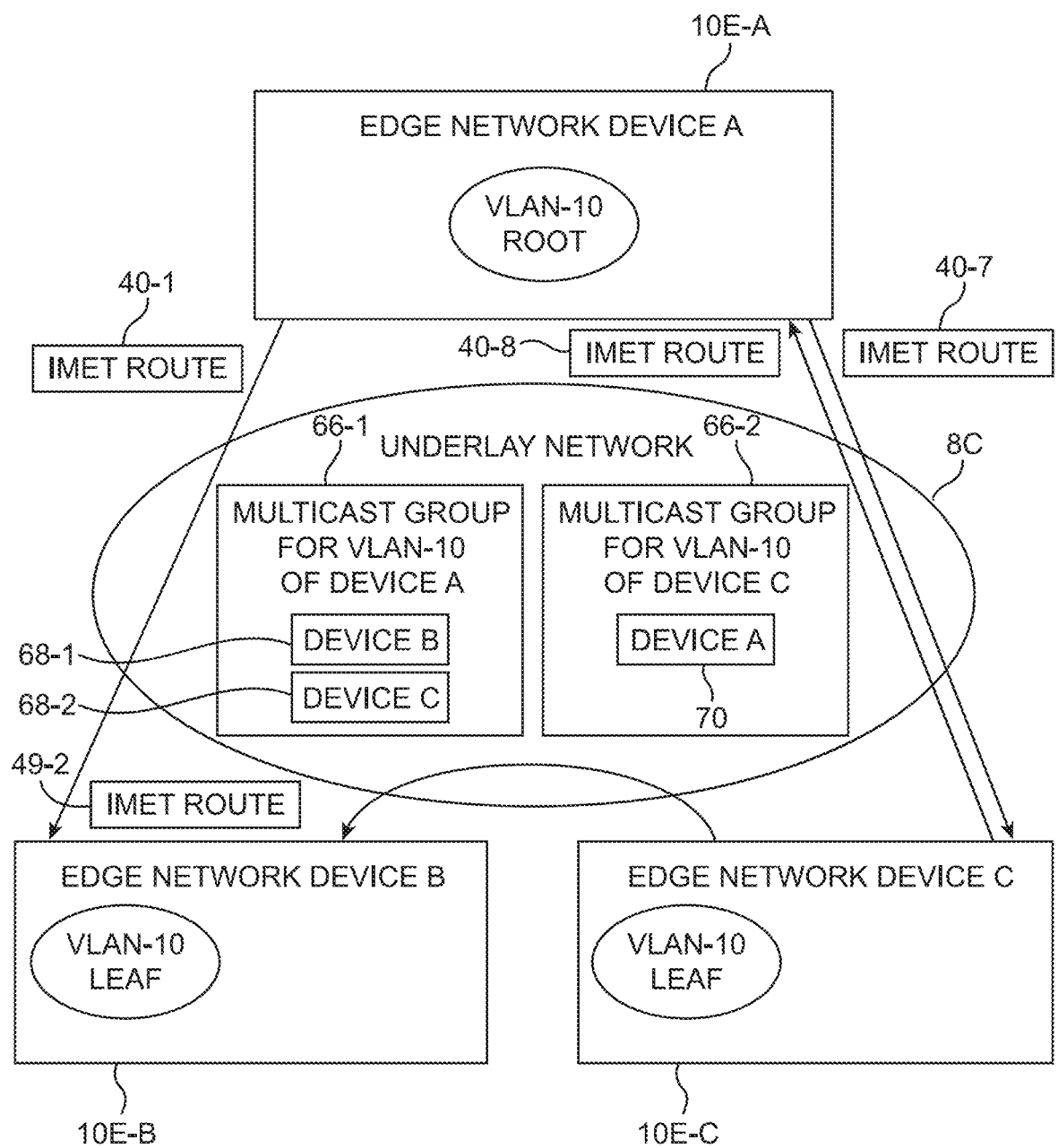
FIG. 9 is a diagram of illustrative EVPN type-3 routes being advertised to facilitate membership in multicast groups for multicast replication in accordance with some embodiments.

FIG. 9 is a diagram of an illustrative network configuration in which underlay network 8C may be configured to perform multicast replication. In particular, underlay network 8C may include one or more network devices (e.g., network devices 10C in FIG. 1) configured to maintain multicast groups and to perform multicast replication based on the maintained multicast groups.

To enable multicast replication for forwarding the BUM traffic, edge network devices (e.g., devices 10E-A, 10E-B, and 10E-C) may optionally send messages to the one or more network devices 10C in network 8C that cause the admittance of the sending edge network device 10E to different multicast groups based on the received IMET routes. FIG. 9 shows four illustrative EVPN type-3 IMET routes being advertised, as examples in connection with VLAN-10 (e.g., the VNI corresponding to VLAN-10 in an underlay network configured for VXLAN or the MAC-VRF instance corresponding to VLAN-10 in an underlay network configured for MPLS).

As a first example, IMET route advertisement message 40-1 from device 10E-A to device 10E-B may indicate that attachment for VLAN-10 at device 10E-A is for a root site (e.g., with the absence of a set leaf-indication flag in message 40-1 as described in connection with FIG. 4). Based on the received device-10E-A-advertised IMET route indicating a remote root site attachment for VLAN-10 at device 10E-A, network device 10E-B (e.g., processing circuitry 28 at network device 10E-B) may send one or more messages to one or more underlay network devices 10C in network 8C to request admittance (e.g., subscribe) to multicast group 66-1 of device 10E-A for VLAN-10. In other words, network device 10E-B requests admittance to multicast group 66-1 because network device 10E-B is attached to a leaf site for VLAN-10 whereas received message 40-1 indicates a remote root site for VLAN-10 at device 10E-A. Accordingly, the one or more underlay network devices 10C may each store an entry 68-1 indicating network device 10E-B (e.g., containing an identifier for device 10E-B) in its multicast group 66-1.

As a second example, IMET route advertisement message 40-2 from device 10E-C to device 10E-B may indicate that attachment for VLAN-10 at device 10E-C is for a leaf site (e.g., with the presence of a set leaf-indication flag in message 40-2 as described in connection with FIG. 4). Based on the received device-10E-C-advertised IMET route indicating a remote leaf site attachment for VLAN-10 at device 10E-C, network device 10E-B (e.g., processing circuitry 28 at network device 10E-B) may not send any messages to underlay network devices 10C in network 8C to request admittance (e.g., subscribe) to multicast group 66-2 of device 10E-C for VLAN-10. In other words, network device 10E-B does not request admittance to multicast group 66-2 because network device 10E-B is attached to a leaf site for VLAN-10 whereas received message 40-2 indicates a remote leaf site for VLAN-10 at device 10E-C. Accordingly, the one or more underlay network devices 10C may each include a multicast group 66-2 that lacks any entries indicating network device 10E-B (e.g., lacks any identifiers for device 10E-B).

As a third example, IMET route advertisement message 40-7 from device 10E-A to device 10E-C may indicate that attachment for VLAN-10 at device 10E-A is for a root site (e.g., with the absence of a set leaf-indication flag in message 40-7 as described in connection with FIG. 4). Based on the received device-10E-A-advertised IMET route indicating a remote root site attachment for VLAN-10 at device 10E-A, network device 10E-C(e.g., processing circuitry 28 at network device 10E-C) may send one or more messages to one or more underlay network devices 10C in network 8C to request admittance to multicast group 66-1 of device 10E-A for VLAN-10. In other words, network device 10E-C requests admittance to multicast group 66-1 because network device 10E-C is attached to a leaf site for VLAN-10 whereas received message 40-7 indicates a remote root site for VLAN-10 at device 10E-A. Accordingly, the one or more underlay network devices 10C may each store an entry 68-2 indicating network device 10E-C (e.g., containing an identifier for device 10E-C) in its multicast group 66-1.

As a fourth example, IMET route advertisement message 40-8 from device 10E-C to device 10E-A may indicate that attachment for VLAN-10 at device 10E-C is for a leaf site (e.g., with the presence of a set leaf-indication flag in message 40-8 as described in connection with FIG. 4). Based on the received device-10E-C-advertised IMET route indicating a remote leaf site attachment, network device 10E-A (e.g., processing circuitry 28 at network device 10E-A) may send one or more messages to one or more underlay network devices 10C in network 8C to request admittance to multicast group 66-2 of device C for VLAN-10. In fact, when local attachment for VLAN-10 at an edge device (e.g., device 10E-A) is for a root site, regardless of whether device 10E-A receives an advertised IMET route (e.g., one or more messages 40) indicating a remote leaf site attachment or a remote root site attachment for VLAN-10, device 10E-A may send one or more messages to one or more underlay network devices 10C to request admittance to multicast group(s) of the advertising edge device for VLAN-10. In general, an edge device locally attached to a root site for a VLAN may request and gain admittance to all of the multicast groups of remote edge devices for the VLAN.

In summary, the one or more underlay network devices 10C (e.g., configured to perform multicast replication at network 8C) may each store a multicast group 66-1 for device 10E-A that contains device 10E-B (e.g., identified by entry 68-1) and device 10E-C(e.g., identified by entry 68-2) as members. The one or more underlay network devices 10C (e.g., configured to perform multicast replication at network 8C) may each store a multicast group 66-2 for device 10E-C that contains device 10E-A (e.g., identified by entry 70) as a member but not device 10E-B. Configured in this manner, the multicast replication infrastructure of underlay network 8C (e.g., the one or more underlay network devices having access to the membership of multicast groups) may provide the desired E-tree service BUM traffic forwarding behavior.

Figure 10:
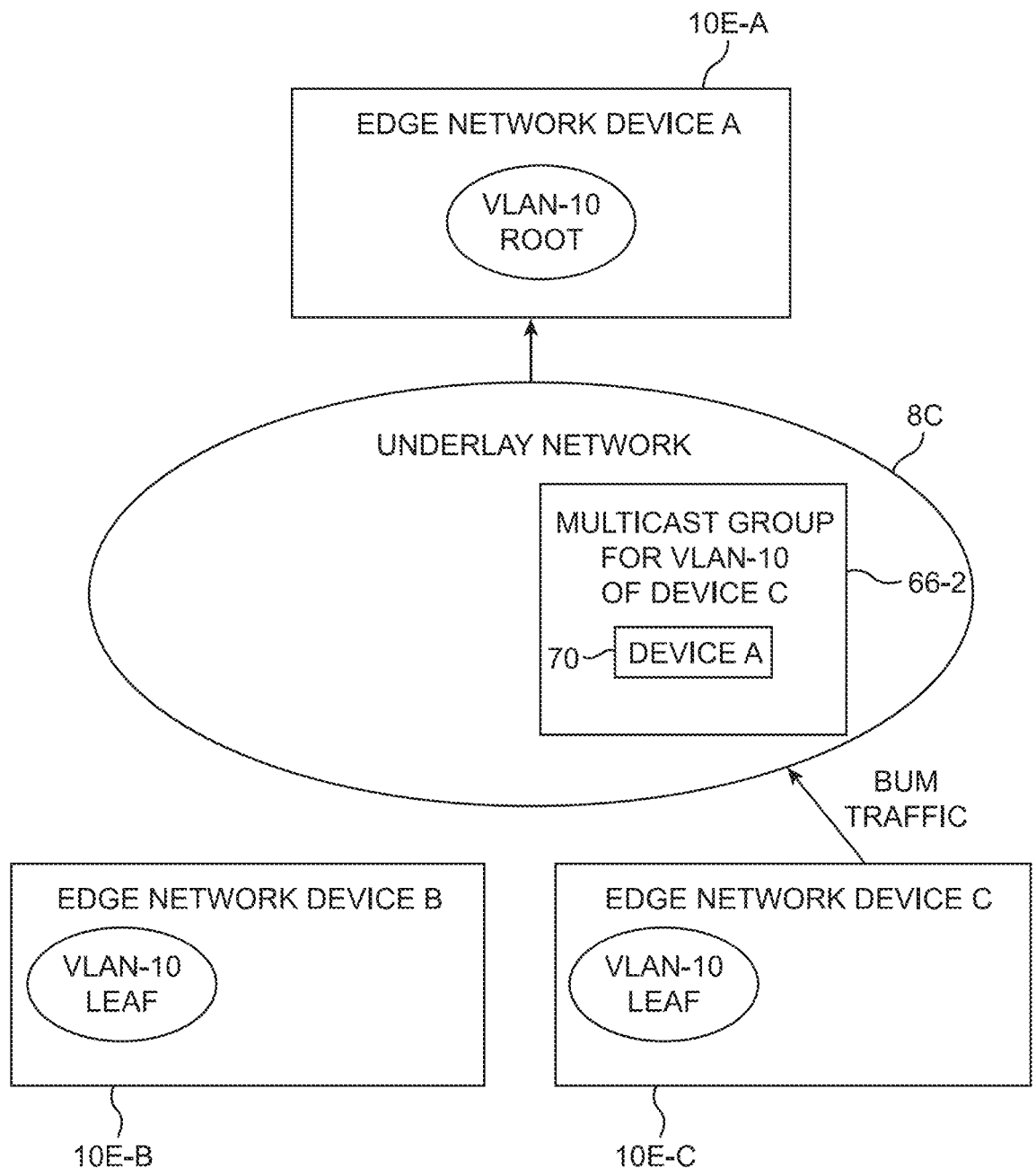
FIG. 10 is a diagram of illustrative BUM traffic handled via multicast replication at the underlay network in accordance with some embodiments.

FIG. 10 shows how underlay network 8C may perform multicast replication for illustrative BUM traffic sourced from the leaf site (e.g., from a host such as host H5 in root leaf site 9C-1 in FIG. 3) for VLAN-10 at device 10E-C. In particular, instead of device 10E-C(e.g., packet processors 32 at device 10E-C) performing ingress filtering (e.g., using a floodlist for VLAN-10 constructed in a similar manner as described in connection with FIGS. 5 and 8 and used in a similar manner as described in connection with FIG. 6), device 10E-C may simply forward the BUM traffic to underlay network 8C (e.g., one or more underlay network devices 10C). The multicast replication infrastructure of underlay network 8C implemented by the one or more underlay network devices 10C may store and/or access the membership of multicast group 66-2 of device C for VLAN-10. Based on the membership of multicast group 66-2 (e.g., indicating the remote edge devices that have subscribed to receiving BUM traffic from network device 10E-C), the one or more underlay network devices 10C may perform appropriate flooding of the BUM traffic. In the example of FIG. 10, because only device 10E-A has subscribed (as indicated by entry 70) to receiving BUM traffic from device 10E-C, the BUM traffic may be flooded or forwarded to device 10E-A and subsequently to its attached root site for VLAN-10. The one or more underlay network devices 10C may not forward the BUM traffic to device 10E-B because it has not subscribed to multicast group 66-2 of device C for VLAN-10.

In some illustrative configurations described herein as an example, the operations described in connection with FIGS. 5, 8, and 9 may be performed by respective control plane processing circuitry 28 on edge devices 10E-A, 10E-B, and/or 10E-C and/or on underlay network devices 10C when executing one or more routing protocol agents such as a BGP agent, an EVPN (E-tree) process, and/or other protocols such as a protocol for supporting multicast replication. In some illustrative configurations described herein as an example, the operations described in connection with FIGS. 6, 7, and 10 may be performed by respective control plane packet processors 32 on edge devices 10E-A, 10E-B, and/or 10E-C and/or on underlay network devices 8C when processing data plane traffic sourced from leaf host(s) and root host(s).

Figure 18:
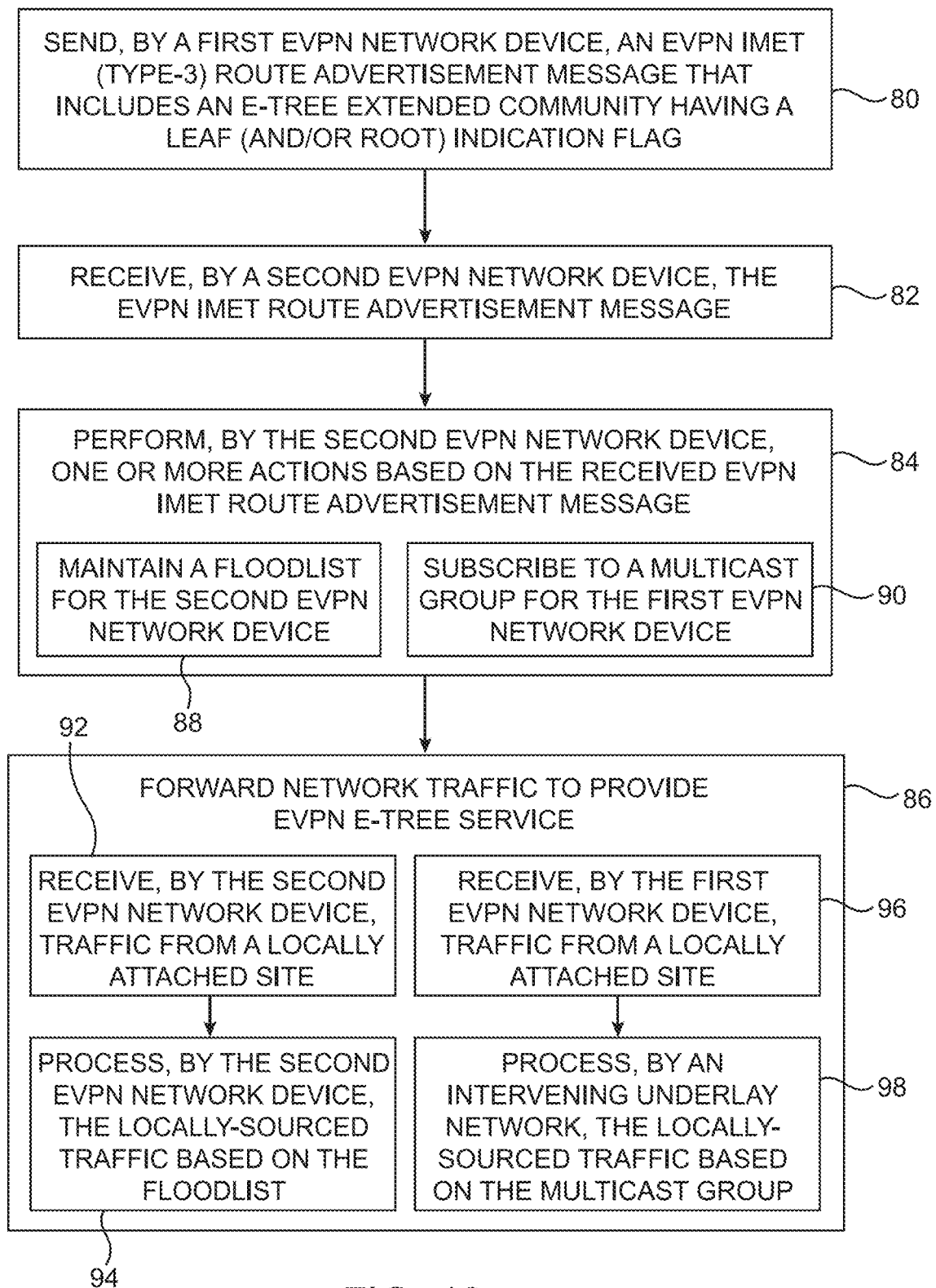
FIG. 18 is a flowchart of illustrative operations for configuring network devices to implement EVPN E-tree service in accordance with some embodiments.

FIG. 18 is a flowchart of illustrative operations for providing traffic handling for EVPN E-tree service. These operations may be performed by one or more EVPN peer network devices such as devices 10C, 10E-A (or 10E-1), 10E-B (or 10E-2), and/or 10E-C (or 10E-3) in FIGS. 1, 3, and 5-10 or more specifically by corresponding control plane processing circuitry 28 in each device 10 and/or by corresponding packet processor(s) 32 in each device 10 (FIG. 2). One or more (e.g., all) illustrative operations described in connection with FIG. 18 may generally be performed by control plane processing circuitry 28 and/or packet processor(s) 32 executing software instructions stored on corresponding memory circuitry 30 (FIG. 2) in each device 10 (e.g., instructions stored on one or more non-transitory computer-readable storage media). If desired, one or more operations described in connection with FIG. 18 may be performed by other dedicated hardware components in each device 10 or performed separately from devices 10.

At block 80, a first EVPN network device may send an EVPN IMET (type-3) route advertisement message that includes an E-tree extended community having a leaf-indication flag. As described sometimes herein, the leaf-indication flag may also be considered a root-indication flag (e.g., a first value indicates a leaf designation and a second value indicates a root designation). Accordingly, the leaf- and/or root-indication flag may generally be referred to as an indicator or indication for leaf or root designation.

As one example of the illustrative operations performed at block 80, processing circuitry 28 on the first EVPN network device may execute a BGP routing agent that performs a routing protocol such as MP-BGP to advertise EVPN route information (e.g., an EVPN IMET route advertisement message 40) containing an indication of leaf or root designation. The EVPN route information may be advertised to multiple EVPN peer network devices (e.g., as part of MP-BGP protocol). EVPN process 36 executing on processing circuitry 28 of the first device may provide the EVPN route information (e.g., content of message 40) to the BGP agent for advertisement to EVPN peer network devices.

Each EVPN IMET route advertisement message 40 may be associated with or advertised for a given identifier and therefore sent on a per-identifier basis (e.g., with each message 40 containing the identifier). With a VXLAN overlay network that connects the first device with its peer device(s), the identifier may be a VNI assigned to a particular VLAN. With an MPLS overlay network that connects the first device with its peer device(s), the identifier may be a MPLS label assigned to a MAC-VRF (e.g., a network portion with a shared MAC-VRF table).

At block 82, a second EVPN network device (e.g., an EVPN peer to the first device) may receive the EVPN IMET route advertisement message. As an example, processing circuitry 28 on the second EVPN network device may similarly execute a BGP agent that performs the routing protocol such as MP-BGP to receive the advertised EVPN route information containing the indication for leaf or root designation (e.g., for the advertised EVPN route or the corresponding site locally attached to the first EVPN network device). EVPN process 36 executing on processing circuitry 28 of the second device may obtain the advertised EVPN route information including the leaf or root designation (e.g., from a BGP agent executing on processing circuitry 28 of the second device).

At block 84, the second EVPN network device may perform one or more actions based on the received EVPN IMET route advertisement message. As an example, EVPN process 36 executing on processing circuitry 28 of the second device may perform and/or cause the performance of one or more of these actions. These one or more actions may help enable or configure one or more network devices such that the network device(s) can properly forward network traffic and provide EVPN E-tree service at block 86.

As a first example, the one or more actions may help configure the second EVPN network device to perform ingress filtering (e.g., ingress replication for BUM traffic). In this example, processing circuitry 28 of the second EVPN network device may maintain (e.g., store and/or update) a floodlist for the second device (at block 88) based on the received EVPN IMET route advertisement message (e.g., based on the indicator of leaf or root designation). In particular, processing circuitry 28 of the second device may maintain multiple floodlists (e.g., at memory circuitry 30) each for a corresponding VLAN or VNI (and/or if desired, for a VLAN bundle having VLANs of the same leaf or root designation).

The one or more actions described in connection to this first example may include any of the aforementioned operations and/or may generally include any of the operations described in connection with FIGS. 5-8 for performing ingress filtering of (BUM and/or known unicast) traffic for EVPN E-tree.

To forward network traffic and provide EVPN E-tree service in this first example, packet processor 32 of the second EVPN network device may receive network traffic from a locally attached site (at block 92). Packet processor 32 of the second device may process the locally-sourced traffic from the first EVPN network device based on the floodlist (at block 94). In particular, packet processor 32 of the second device may access (e.g., lookup) the appropriate floodlist out of the multiple floodlists for handling the locally-sourced traffic (e.g., for a particular VLAN). In some illustrative arrangements, packet processor 32 at the second device may perform, based on the appropriate floodlist, ingress replication for locally-sourced BUM traffic that replicates and floods the traffic at the ingress-side of the underlay network (e.g., network 8C) to reach the appropriate set of EVPN peer device(s) and maintain the desired isolation for E-tree service (e.g., isolation between leaf sites). In some illustrative arrangements, packet processor 32 at the second device may perform, based on the appropriate floodlist, ingress filtering for locally-sourced known unicast traffic that drops the known unicast traffic at the ingress-side of the underlay network (e.g., network 8C) to prevent reachability to some of the EVPN peer device(s) and maintain the desired isolation for E-tree service (e.g., isolation between leaf sites).

At a second example, the one or more actions may help configure one or more underlay network devices (e.g., devices 10C in FIG. 1) or generally the underlay network (e.g., network 8C in FIGS. 1, 9, and 10) to perform multicast replication. In this example, processing circuitry 28 of the second EVPN network device may subscribe (e.g., send one or more messages to request admittance, send one or more messages to gain admittance to, send one or more messages to acknowledge admittance to, etc.) to a multicast group for the first EVPN network device (at block 90) based on the received EVPN IMET route advertisement message (e.g., based on the indicator of leaf or root designation). In particular, the underlay network (e.g., devices 10C in the underlay network) may maintain multiple multicast groups as part of its multicast replication infrastructure. Each of the multicast groups may be for a corresponding VLAN or VNI and for a particular EVPN peer network device (e.g., a device may be associated with multiple multicast groups each for a different VLAN or VNI, multiple devices may be associated with corresponding multicast groups for the same VLAN or VNI, etc.).

The one or more actions described in connection to this second example may include any of the aforementioned operations and/or may generally include any of the operations described in connection with FIGS. 9 and 10 for performing multicast replication of BUM traffic for EVPN E-tree.

To forward network traffic and provide EVPN E-tree service in this second example, packet processor 32 of the first EVPN network device may receive (BUM) network traffic from a locally attached site (at block 96). Packet processor 32 of the first device may pass the BUM traffic to one or more underlay network devices without replication or flooding at the first device. Packet processors 32 of one or more underlay network devices 10C in the intervening underlay network between the first and second EVPN network devices may process the locally-sourced traffic from the first EVPN network device based on the multicast group (at block 98). In particular, packet processor(s) 32 of the underlay network device(s) may access (e.g., lookup) the appropriate multicast group out of the multiple multicast groups for handling the locally-sourced traffic sourced from a site locally attached to the first device (e.g., for a particular VLAN). In some illustrative arrangements, packet processor(s) 32 at the underlay network device(s) may perform, based on the appropriate multicast group, multicast replication for locally-sourced BUM traffic that replicates and floods the traffic at the underlay network (e.g., network 8C) to reach the appropriate set of EVPN peer device(s) and maintain the desired isolation for E-tree service (e.g., isolation between leaf sites).

In some illustrative configurations described herein as an example, control plane processing circuitry 28 of respective network devices are used to perform the operations at blocks 80, 82, and 84, whereas packet processor(s) 32 of respective network devices are used to perform the operations at block 86. This is merely illustrative. If desired, any suitable processing circuitry (e.g., control plane processing circuitry and/or data plane processing circuitry) may be used to perform any of the operations described in connection with FIG. 18.

E-Tree Service Via Gateways

Figure 11:
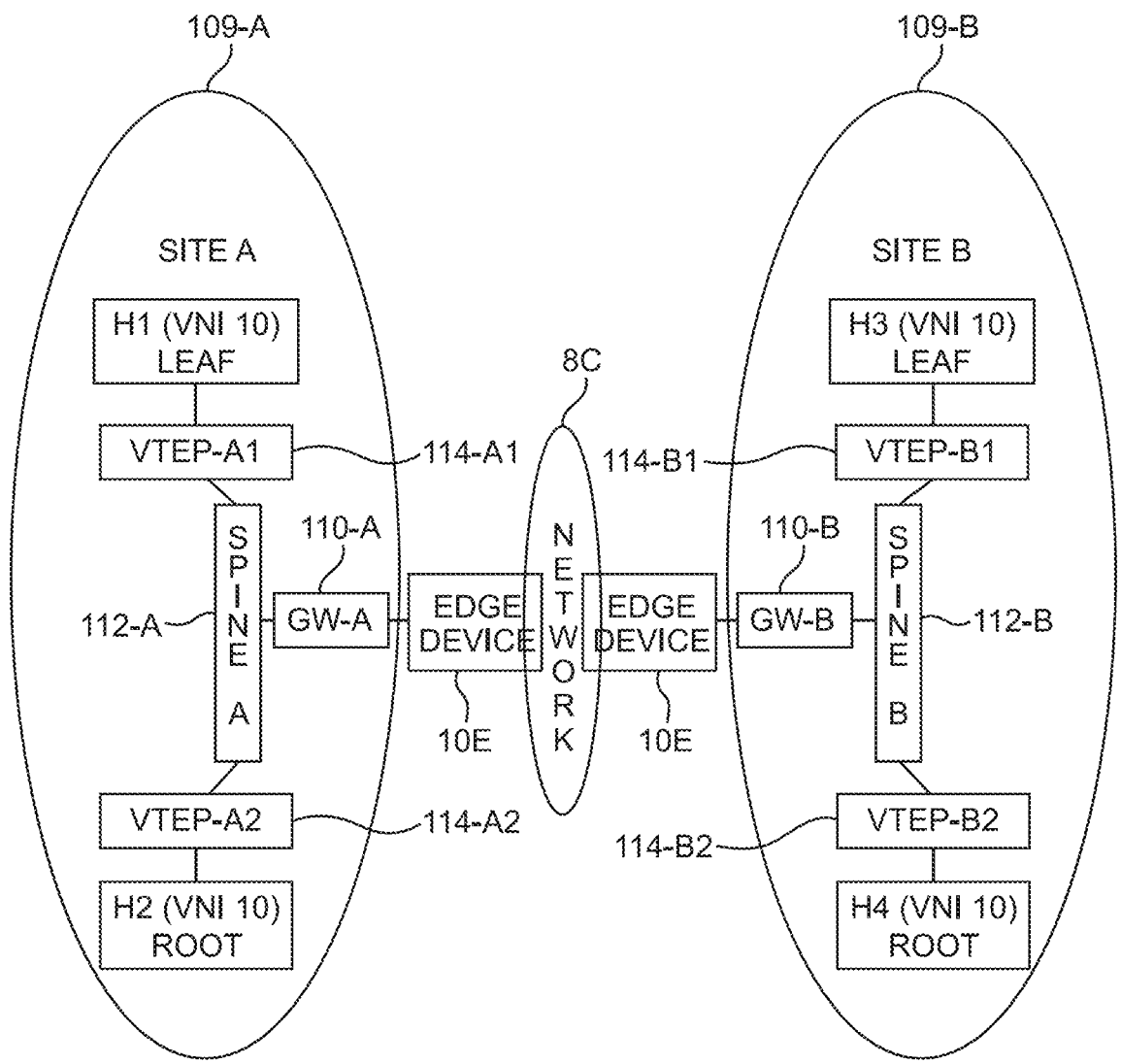
FIG. 11 is a diagram of an illustrative network configuration with gateways for respective sites connected via corresponding edge devices in a network in accordance with some embodiments.

In some arrangements, site gateways may provide connectivity (e.g., may interface) between edge network devices and the corresponding sites (e.g., network devices and hosts within the sites that are behind the gateways). FIG. 11 is a diagram of an illustrative network configuration (e.g., for network 8 in FIG. 1) containing two sites 109-A and 109-B connected by an intervening network having a corresponding edge device facing each site. In the example of FIG. 11, edge devices 10E in FIG. 11 may correspond to two of edge devices 10E-1, 10E-2, and 10E-3 in FIG. 1 and the intervening network may correspond to network 8C. Configurations in which intervening network 8C and edge devices 10E implement a datacenter interconnect network and/or a VXLAN network over which EVPN E-tree service is provided are sometimes described herein as an illustrative example.

As shown in FIG. 11, root and leaf hosts in each site such as leaf host H1 and root host H2 for site 109-A and leaf host H3 and root host H4 for site 109-B may be behind a site gateway (e.g., a datacenter interconnect gateway) that receives all traffic (e.g., both root and leaf traffic) sourced from hosts in the site and destined to hosts in the site (e.g., a remote site external to the site). A root host may refer to a host attached to a virtual tunnel endpoint (VTEP) configured with a root VLAN attachment. A leaf host may refer to a host attached to a VTEP (virtual tunnel endpoint) configured with a leaf VLAN attachment.

As shown in FIG. 11, gateway 110-A for site 109-A (or generally domain 109-A) may be coupled to a spine network device 112-A (e.g., one or more switches or generally one or more network devices in a spine layer). Spine network device 112-A may be coupled to a VTEP network device 114-A1 (e.g., implemented at or using a switch or network device in the leaf layer) to which leaf host H1 for a given VLAN identified by VNI 10 is attached. Spine network device 112-A may be coupled to a VTEP network device 114-A2 (e.g., implemented at or using a switch or network device in the leaf layer) to which root host H2 for the given VLAN identified by VNI 10 is attached.

As desired, VTEP network devices 114-A1 and 114-A2 may be implemented on the same network device or on different network devices, may each be coupled to the one or more spine network devices, and/or may be coupled to additional root or leaf hosts in the same VLAN or in different VLANs. The configuration of site 109-A in FIG. 11 is merely illustrative.

Gateway 110-B for site 109-B (or generally domain 109-B) may be coupled to a spine network device 112-B (e.g., one or more switches or generally one or more network devices in a spine layer). Spine network device 112-B may be coupled to a VTEP network device 114-B1 (e.g., implemented at or using a switch or network device in the leaf layer) to which leaf host H3 for the given VLAN identified by VNI 10 is attached. Spine network device 112-B may be coupled to a VTEP network device 114-B2 (e.g., implemented at or using a switch or network device in the leaf layer) to which root host H4 for the given VLAN identified by VNI 10 is attached.

As desired, VTEP network devices 114-B1 and 114-B2 may be implemented on the same network device or on different network devices, may each be coupled to the one or more spine network devices, and/or may be coupled to additional root or leaf hosts in the same VLAN or in different VLANs. The configuration of site 109-B in FIG. 11 is merely illustrative.

One or more of network devices in FIG. 11 such as gateways 110-A and 110-B, spine network device(s) 112-A and 112-B, VTEP network devices(s) 114-A1, 114-A2, 114-B1, and 114-B2 may be implemented based on the same types of hardware components in device 10E of FIG. 2 (e.g., may include one or more, or all, hardware components of device 10E in FIG. 2). In some instances, gateways 110-A and 110-B and/or VTEP network devices 114-A1, 114-A2, 114-B1, and 114-B2 may each include control plane processing circuitry 28 configured to execute an EVPN process such as EVPN process 36 in FIG. 2. In other instances, processing circuitry 28 of the network devices in FIG. 11 may execute routing protocol processes in addition to or instead of EVPN process 28.

Configurations in which gateways 110-A and 110-B are each an instance of network device 10E in FIG. 2, and therefore exchange EVPN routing information with each other through network 8C and devices 10E in FIG. 11, are sometimes described herein as an illustrative example. To facilitate EVPN E-tree BUM traffic handling, gateway 110-A and gateway 110-B (e.g., corresponding processing circuitry 28 on gateways 110-A and 110-B) may exchange EVPN routes such as using EVPN (type-3) IMET route advertisement messages 40 of the type described in connection with FIG. 4, with each message 40 containing a set leaf-indication flag to indicate a leaf attachment (or a cleared flag to indicate root attachment).

In order to not obscure the embodiments of FIGS. 12-17, the physical network paths coupling one or more pairs of network devices as shown in FIG. 11 have been omitted from FIGS. 12-17. In general, pair(s) of network devices may each communicate (e.g., routing advertisement messages, production traffic, and/or other types of traffic) therebetween via any suitable network path(s) such as those described in connection with FIG. 11 (e.g., using the network paths depicted within site 109-A, using network paths depicted within site 109-B, using network paths between sites 109-A and 109-B such as those in network 8C, etc.).

Figure 12:
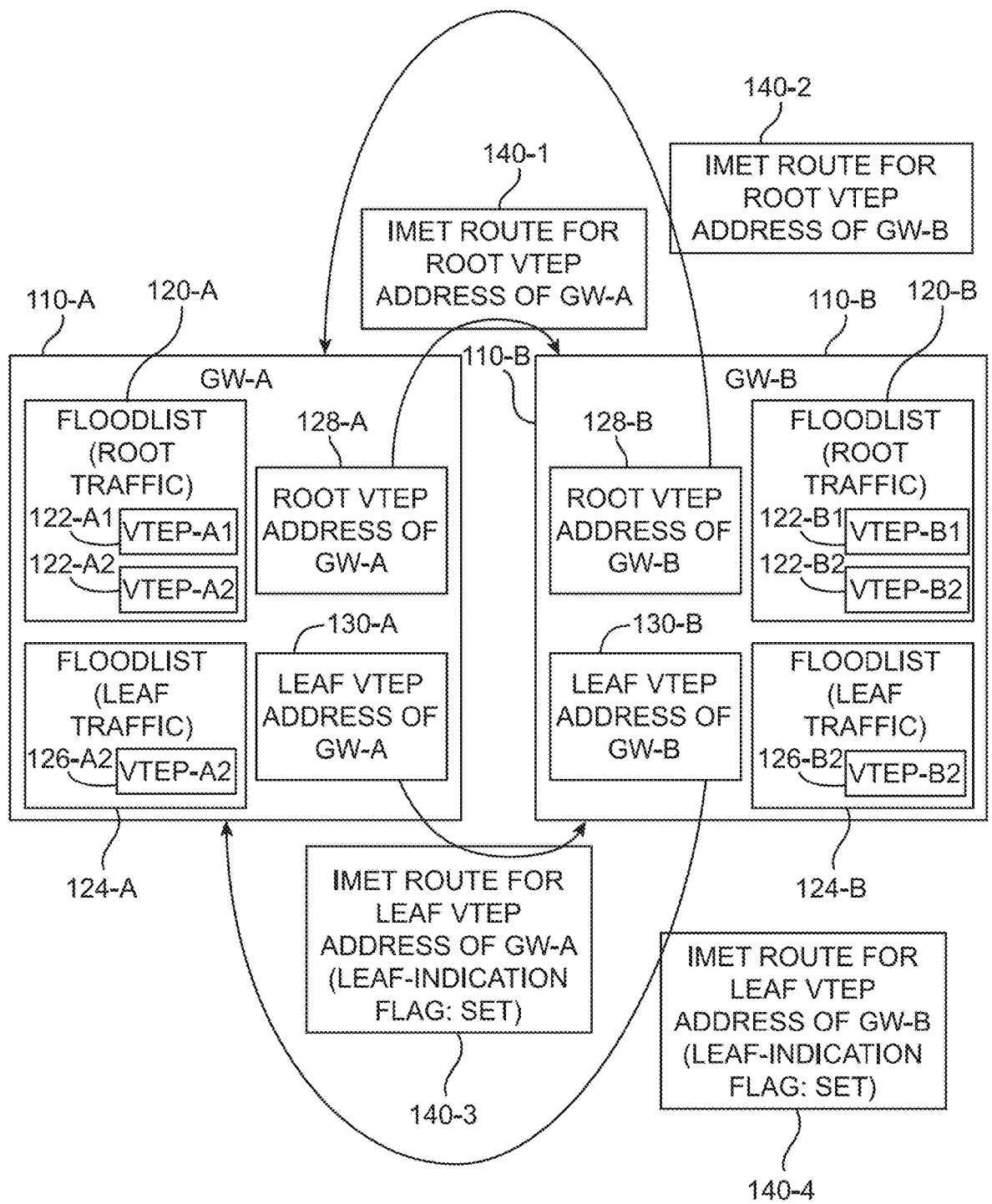
FIG. 12 is a diagram of illustrative EVPN type-3 routes being advertised between gateways at different sites in accordance with some embodiments.

FIG. 12 shows how gateways 110-A and 110-B may be configured to exchange EVPN routing information to help facilitate EVPN E-tree BUM traffic handling between sites 109-A and 109-B.

Gateways 110-A and 110-B may each obtain information, for each VNI and/or VLAN identified by the VNI, identifying one or more VTEPs in its domain (e.g., site 109-A or 109-B) and the classification or designation of each VTEP as a root (e.g., attached to a root host such as root host H2 or root host H4) and a leaf (e.g., attached to a leaf host such as leaf host H1 or leaf host H3). Each gateway 110 may obtain the root or leaf designation for each VTEP based on communication with each corresponding VTEP device 114, based on user input indicating VTEP configuration, and/or in other manners.

Gateway 110-A (e.g., processing circuitry 28 on gateway 110-A) may maintain (e.g., generate, updated, and/or store) a first floodlist such as root traffic floodlist 120-A (e.g., on corresponding memory circuitry 30 on gateway 110-A) to include and identify all VTEPs in its domain (e.g., VTEP-A1 on device 114-A1 and VTEP-A2 on device 114-A2). In particular, floodlist 120-A may include a first entry 122-A1 identifying VTEP-A1 and/or device 114-A1 and a second entry 122-A2 identifying VTEP-A2 and/or device 114-A2. Gateway 110-A may also maintain a second floodlist such as leaf traffic floodlist 124-A (e.g., on corresponding memory circuitry 30 on gateway 110-A) to include and identify only the VTEPs in its domain for which the local attachment (e.g., for that VNI) is classified as a root (e.g., VTEP-A2 on device 114-A2 attached to root host H2 for VNI 10). In particular, floodlist 124-A may include entry 126-A2 identifying VTEP-A2 and/or device 114-A2.

Gateway 110-B (e.g., processing circuitry 28 on gateway 110-B) may maintain (e.g., generate, updated, and/or store) a first floodlist such as root traffic floodlist 120-B (e.g., on corresponding memory circuitry 30 on gateway 110-B) to include and identify all VTEPs in its domain (e.g., VTEP-B1 on device 114-B1 and VTEP-B2 on device 114-B2). In particular, floodlist 120-B may include a first entry 122-B1 identifying VTEP-B1 and/or device 114-B1 and a second entry 122-B2 identifying VTEP-B2 and/or device 114-B2. Gateway 110-B may also maintain a second floodlist such as leaf traffic floodlist 124-B (e.g., on corresponding memory circuitry 30 on gateway 110-B) to include and identify only the VTEPs in its domain for which the local attachment (e.g., for that VNI) is classified as a root (e.g., VTEP-B2 on device 114-B2 attached to root host H4 for VNI 10). In particular, floodlist 124-B may include entry 126-B2 identifying VTEP-B2 and/or device 114-B2.

Each gateway 110 may also define two separate and different VTEP addresses: a root VTEP address and a leaf VTEP address. As some illustrative examples, one or both gateways 110-A and 110-B may each receive pre-defined configurations for root and leaf VTEP addresses from one or more external network devices such as a same centralized network controller or different site network controllers, may each locally configure its own root and leaf VTEP addresses, or may generally obtain configurations for its own root and leaf VTEP addresses in any suitable manner, whether from remote source(s) or locally. As shown in FIG. 12, gateway 110-A may define (e.g., generate) a root VTEP address 128-A and a leaf VTEP address 130-A. Gateway 110-B may define (e.g., generate) a root VTEP address 128-B and a leaf VTEP address 130-B.

Each gateway 110 may use one of the two (root or leaf) VTEP addresses to advertise its corresponding (root- or leaf-indicating) type of EVPN type-3 IMET route. In particular, gateway 110-A may advertise the IMET route (e.g., in message 140-1 which lacks a set leaf-indication flag or has a cleared leaf-indication flag) using root VTEP address 128-A of gateway 110-A to gateway 110-B. Gateway 110-B may advertise the IMET route (e.g., in message 140-2 which lacks a set leaf-indication flag or has a cleared leaf-indication flag) using root VTEP address 128-B of gateway 110-B to gateway 110-A. Gateway 110-A may advertise the IMET route (e.g., in message 140-3 which contains a set leaf-indication flag) using leaf VTEP address 130-A of gateway 110-A to gateway 110-B. Gateway 110-B may advertise the IMET route (e.g., in message 140-4 which contains a set leaf-indication flag) using leaf VTEP address 130-B of gateway 110-B to gateway 110-A.

Each of messages 140-1, 140-2, 140-3, and 140-4 may be of the same type or have the same format as message 40 in FIG. 4 (e.g., with an E-tree extended community or another indication for a leaf or root designation). As described above, messages 140-1 may contain and/or identify root VTEP address 128-A, messages 140-2 may contain and/or identify root VTEP address 128-B, messages 140-3 may contain and/or identify leaf VTEP address 130-A, and messages 140-4 may contain and/or identify leaf VTEP address 130-B.

In some illustrative configurations described herein as an example, the operations described in connection with FIG. 12 may be performed by respective control plane processing circuitry 28 on gateways 110-A and 110-B when executing one or more routing protocol agents such as a BGP agent and/or an EVPN (E-tree) process. In some illustrative configurations described herein as an example, the operations described in connection with FIGS. 13 and 14 may be performed by respective control plane packet processors 32 on gateways 110-A and 110-B when processing data plane traffic sourced from leaf host(s) and root host(s).

Figure 13:
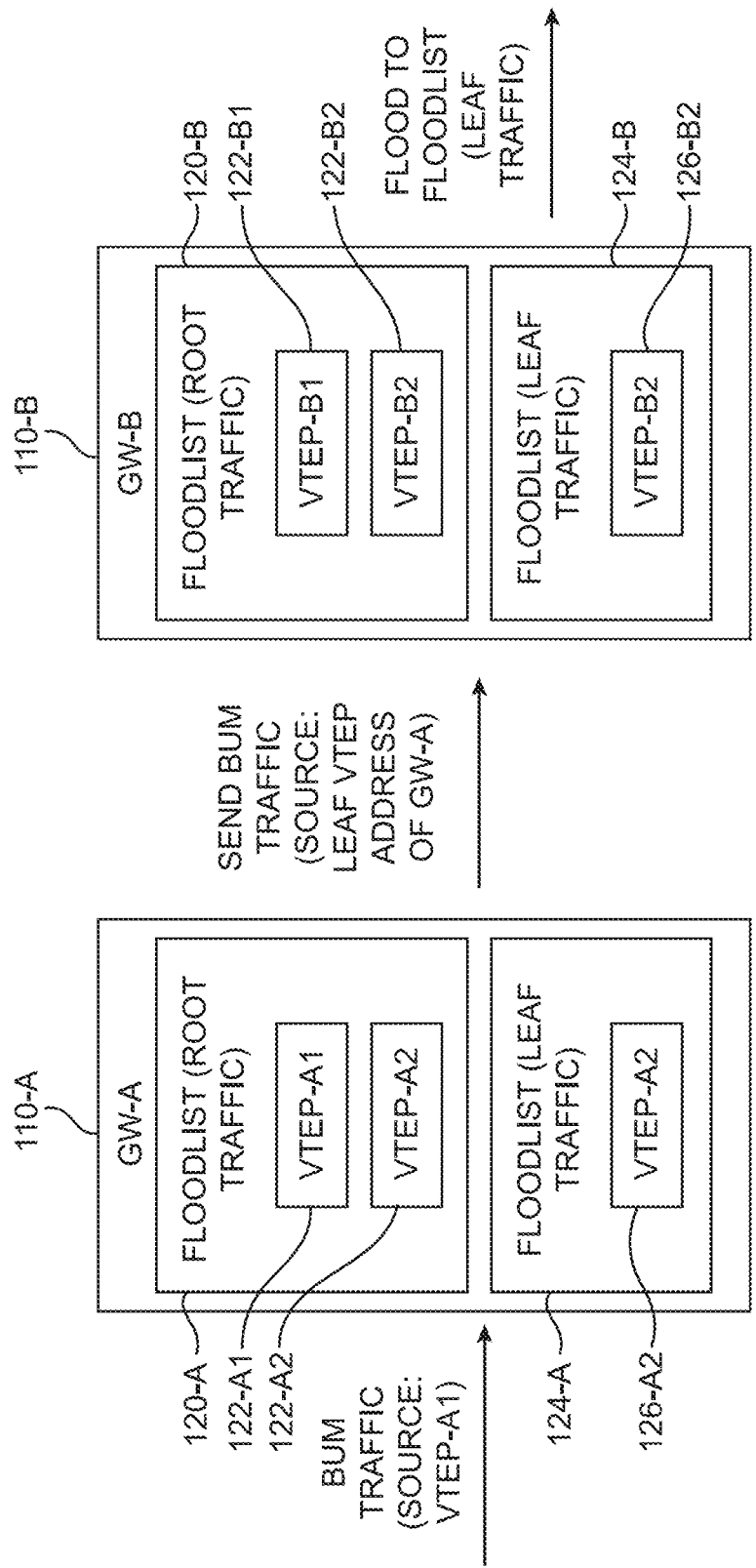
FIG. 13 is a diagram of illustrative handling of leaf-sourced BUM traffic between gateways at different sites in a network configuration of the type described in connection with FIGS. 11 and 12 in accordance with some embodiments.

Configured in the manner described in connection with FIG. 12, gateways 110-A and 110-B may help handle data plane BUM traffic flooding for EVPN E-tree service. FIG. 13 shows how gateways 110-A and 110-B can handle (e.g., forward, replicate, flood, and/or drop) BUM traffic sourced from a leaf host such as host H1 attached to VTEP device 114-A1. Gateway 110-A may receive the BUM traffic sourced from VTEP-A1 on VTEP device 114-A1 and perform a lookup operation based on the source VTEP VTEP-A1 (e.g., by comparing the source VTEP VTEP-A1 to entries in one or both of local floodlists 120-A and 124-A on memory circuitry 30 of gateway 110-A). If gateway 110-A determines that the source VTEP VTEP-A1 is in root traffic floodlist 120-A but not in leaf traffic floodlist 124-A, this may be indicative of the source VTEP and the attached host H1 having a leaf designation. Because leaf traffic floodlist 124-A should contain only root VTEP entries, gateway 110-A comparing the source VTEP VTEP-A1 to entries in leaf traffic floodlist 124-A to produce no matches may be sufficient (without comparing to entries in root traffic floodlist 120-A) to indicate that the source VTEP and the attached host H1 have a leaf designation. Based on the result of the lookup operation (e.g., one or more comparisons), gateway 110-A may subsequently send the (leaf-sourced) BUM traffic to gateway 110-B using leaf VTEP address 130-A of gateway 110-A to encapsulate the leaf-sourced BUM traffic.

Upon reception of the BUM traffic with the source being leaf VTEP address 130-A of gateway 110-A, gateway 110-B may determine that the received BUM traffic is leaf-sourced. In particular, gateway 110-B may make this determination by performing a lookup operation that compares the source VTEP address in the BUM traffic to information stored based on the gateway-110-A-advertised IMET route in (leaf-indicating) message 140-3 (FIG. 12) indicating the previously advertised VTEP address 130-A of gateway 110-A has a leaf designation. Based on the source VTEP address of the received BUM traffic matching the previously advertised leaf VTEP address 130-A of gateway 110-A, gateway 110-B may flood the received leaf-sourced BUM traffic using its local leaf traffic floodlist 124-B to appropriately reach root VTEP-B2 on device 114-B2 and root host H4.

Figure 14:
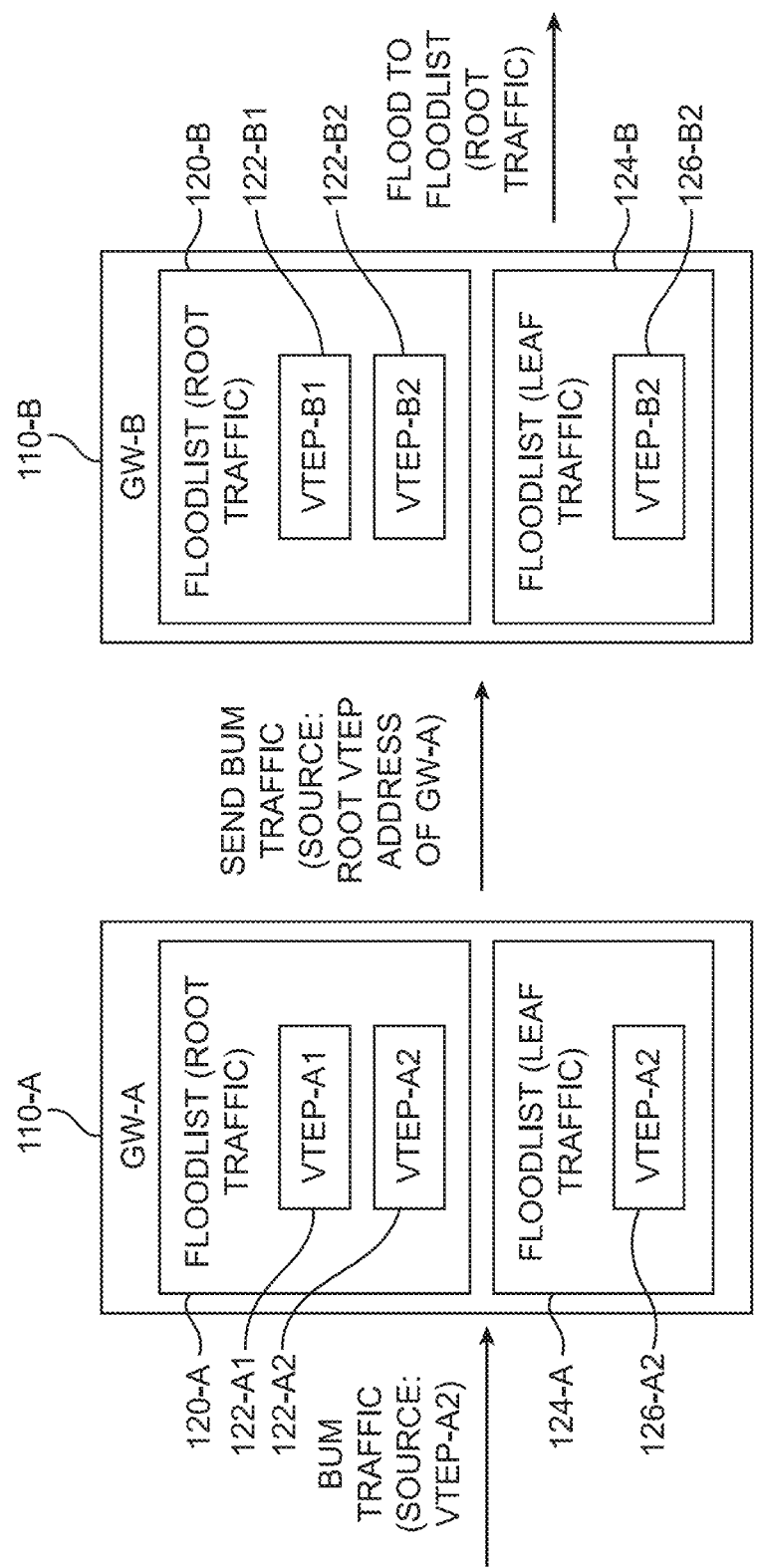
FIG. 14 is a diagram of illustrative handling of root-sourced BUM traffic between gateways at different sites in a network configuration of the type described in connection with FIGS. 11 and 12 in accordance with some embodiments.

FIG. 14 shows how gateways 110-A and 110-B handle (e.g., forward, replicate, flood, and/or drop) BUM traffic sourced from a root host such as host H2 attached to VTEP device 114-A2. Gateway 110-A may receive the BUM traffic sourced from VTEP-A2 on VTEP device 114-A2 and perform a lookup operation based on the source VTEP VTEP-A2 (e.g., by comparing the source VTEP VTEP-A2 to entries in one or both of local floodlists 120-A and 124-A on memory circuitry 30 of gateway 110-A). If gateway 110-A determines that the source VTEP VTEP-A2 is in root traffic floodlist 120-A and also in leaf traffic floodlist 124-A, this may be indicative of the source VTEP and the attached host H2 having a root designation. Because leaf traffic floodlist 124-A should contain only root VTEP entries, gateway 110-A comparing the source VTEP VTEP-A2 to entries in leaf traffic floodlist 124-A to produce a match may be sufficient (without comparing to entries in root traffic floodlist 120-A) to indicate that the source VTEP and the attached host H1 have a root designation. Based on the result of the lookup operation (e.g., one or more comparisons), gateway 110-A may subsequently send the (root-sourced) BUM traffic to gateway 110-B using root VTEP address 128-A of gateway 110-A to encapsulate the root-sourced BUM traffic.

Upon reception of the BUM traffic with the source being root VTEP address 128-A of gateway 110-A, gateway 110-B may determine that the received BUM traffic is root-sourced. In particular, gateway 110-B may make this determination by performing a lookup operation that compares the source VTEP address in the BUM traffic to information stored based on the gateway-110-A-advertised IMET route in (root-indicating) message 140-1 (FIG. 12) indicating the previously advertised VTEP address 128-A of gateway 110-A has a root designation. Based on the source VTEP address of the received BUM traffic matching the previously advertised root VTEP address 128-A of gateway 110-A, gateway 110-B may flood the received root-sourced BUM traffic using its local root traffic floodlist 120-B to appropriately reach leaf VTEP-B1 on device 114-B1 and leaf host H3, and appropriately reach root VTEP-B2 on device 114-B2 and root host H4.

Figure 16:
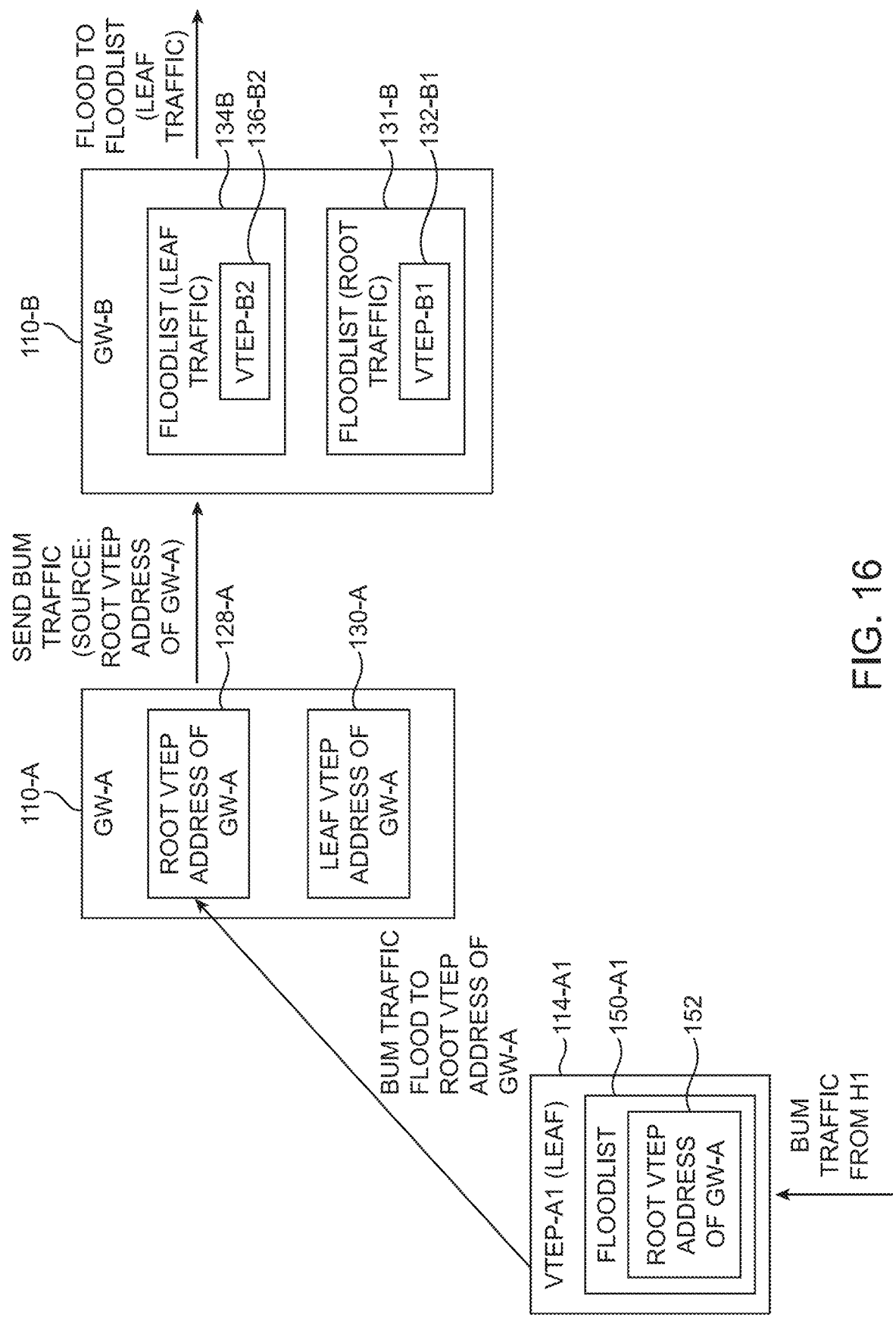
FIG. 16 is a diagram of illustrative handling of leaf-sourced BUM traffic in a network configuration of the type described in connection with FIGS. 11 and 15 in accordance with some embodiments.
Figure 17:
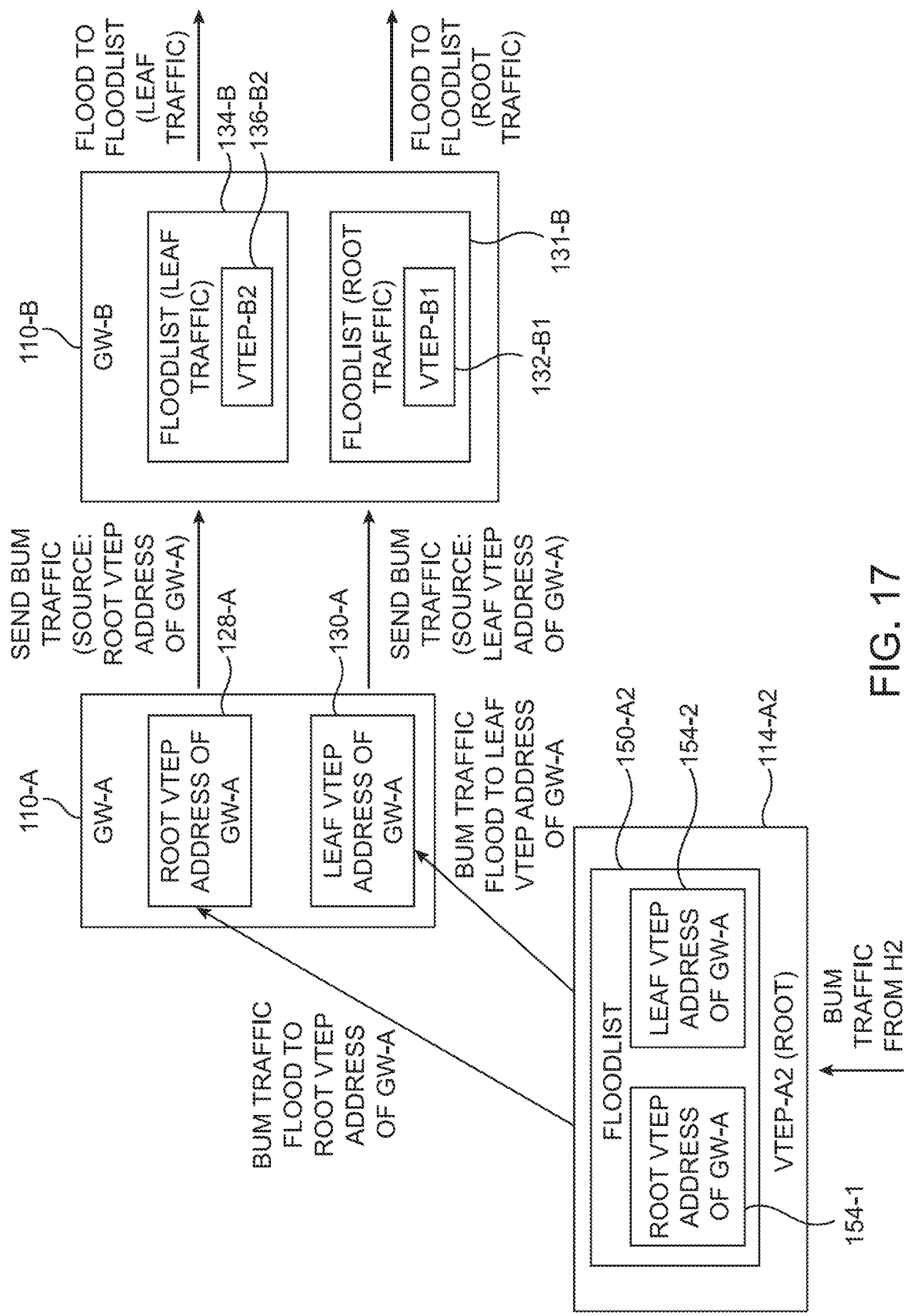
FIG. 17 is a diagram of illustrative handling of root-sourced BUM traffic in a network configuration of the type described in connection with FIGS. 11 and 15 in accordance with some embodiments.

While the gateway configurations described in connection with FIGS. 12-14 provide the appropriate EVPN E-tree BUM traffic handling, gateways 110-A and 110-B may each be required to perform a source VTEP lookup operation to process each packet in the BUM traffic. If desired, in some illustrative arrangements, gateways 110-A and 110-B may be configured such that the source VTEP lookup operation on the ingress-side gateway can be omitted when processing each packet in the BUM traffic. As an example, FIGS. 15-17 illustrate gateway configurations and VTEP device configurations that provide the appropriate EVPN E-tree BUM traffic handling with reduced source VTEP lookup operations.

In some illustrative configurations described herein as an example, the operations described in connection with FIG. 15 may be performed by respective control plane processing circuitry 28 on gateways 110-A and 110-B, and on VTEP devices 114-A1, 114-A2, 114-B1, and 114-B2 when executing one or more routing protocol agents such as a BGP agent and/or an EVPN (E-tree) process. In some illustrative configurations described herein as an example, the operations described in connection with FIGS. 16 and 17 may be performed by respective control plane packet processors 32 on gateways 110-A and 110-B, and on VTEP devices 114-A1, 114-A2, 114-B1, and 114-B2 when processing data plane traffic sourced from leaf host(s) and root host(s).

Figure 15:
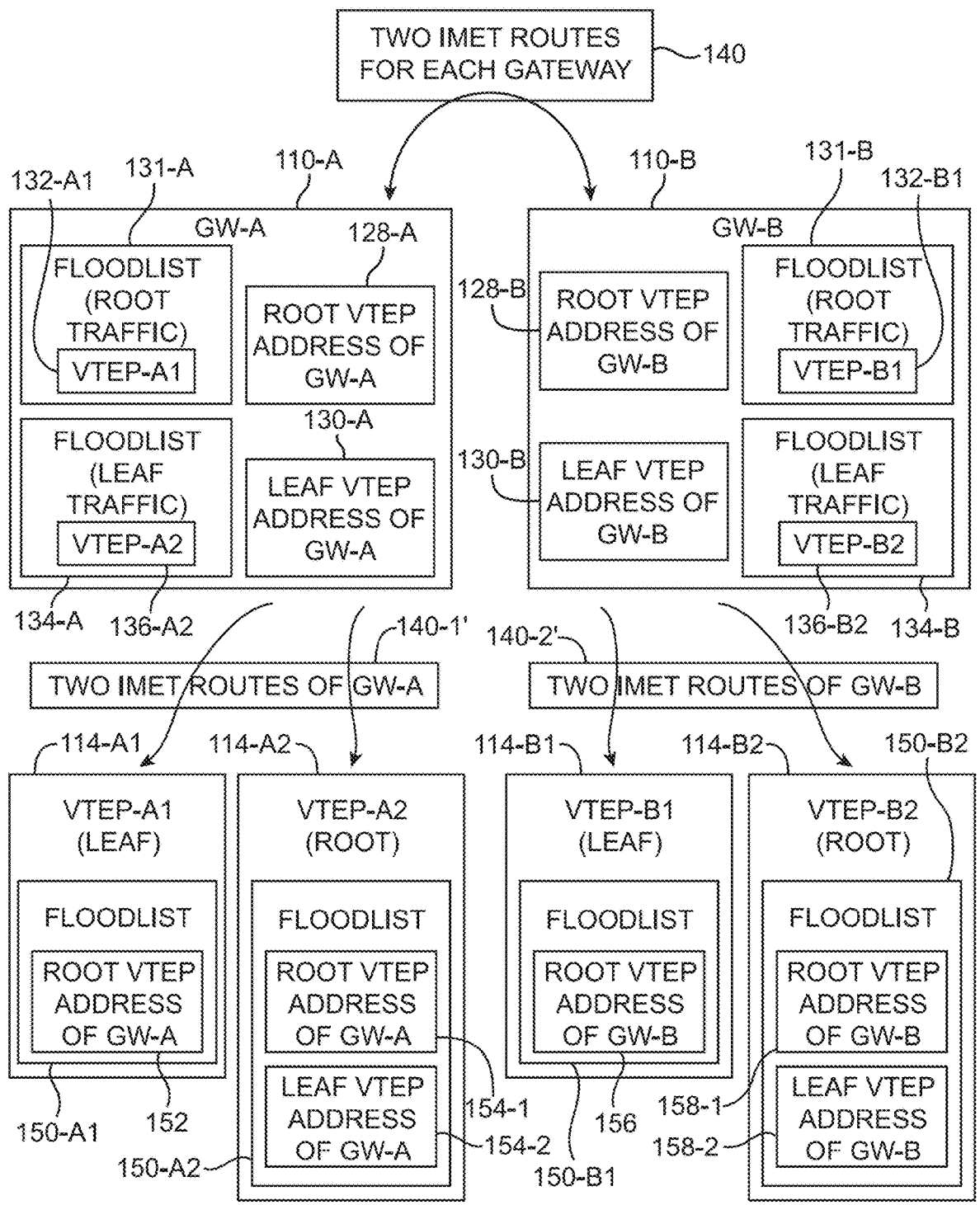
FIG. 15 is a diagram of illustrative EVPN type-3 routes being advertised between gateways at different sites and within each corresponding local domain in accordance with some embodiments.

In comparison with the gateway configurations of FIG. 12, gateway 110-A in FIG. 15 may maintain (e.g., generate, update, and/or store) a first floodlist such as root traffic floodlist 131-A (e.g., on corresponding memory circuitry 30 on gateway 110-A) to include and identify only the leaf VTEPs in its domain (e.g., VTEP-A1 on VTEP device 114-A1). In particular, floodlist 131-A may include entry 132-A1 identifying VTEP-A1 and/or device 114-A1. Gateway 110-A may also maintain a second floodlist such as leaf traffic floodlist 134-A (e.g., on corresponding memory circuitry 30 on gateway 110-A) to include and identify only the root VTEPs in its domain (e.g., VTEP-A2 on VTEP device 114-A2). In particular, floodlist 134-A may include entry 136-A2 identifying VTEP-A2 and/or device 114-A2.

Gateway 110-B in FIG. 15 may maintain (e.g., generate, update, and/or store) a first floodlist such as root traffic floodlist 131-B (e.g., on corresponding memory circuitry 30 on gateway 110-B) to include and identify only the leaf VTEPs in its domain (e.g., VTEP-B1 on VTEP device 114-B1). In particular, floodlist 131-B may include entry 132-B1 identifying VTEP-B1 and/or device 114-B1. Gateway 110-B may also maintain a second floodlist such as leaf traffic floodlist 134-B (e.g., on corresponding memory circuitry 30 on gateway 110-B) to include and identify only the root VTEPs in its domain (e.g., VTEP-B2 on VTEP device 114-B2). In particular, floodlist 134-B may include entry 136-B2 identifying VTEP-B2 and/or device 114-B2.

In addition to advertising the two IMET routes in messages 140 to its peer gateway using its own root and leaf VTEP addresses, respectively, (e.g., in the same manner as described in connection with messages 140-1 and 140-3 for gateway 110-A, and messages 140-2 and 140-4 for gateway 110-B in FIG. 12), each gateway 110 may also advertise both of its own IMET routes to local VTEP devices 114 in its domain. In particular, gateway 110-A may advertise messages 140-1 and 140-3 (collectively referred to as messages 140-1') to each VTEP device in domain 109-A such as VTEP devices 114-A1 and 114-A2. Gateway 110-B may advertise messages 140-2 and 140-4 (collectively referred to as messages 140-2') to each VTEP device in domain 109-B such as VTEP devices 114-B1 and 114-B2.

VTEP devices 114-A1 and 114-A2 may each maintain (e.g., generate, update, and/or store) its own floodlist (e.g., in the same manner as described in connection with FIGS. 5 and 8). In particular, because VTEP-A1 has a leaf designation (e.g., is attached to leaf host H1), VTEP device 114-A1 may maintain floodlist 150-A1 to include entries that only identify local gateway VTEP address(es) designated for leaf-sourced traffic. In particular, floodlist 150-A1 may include entry 152 identifying root VTEP address 128-A of gateway 110-A. Because VTEP-A2 has a root designation (e.g., is attached to root host H2), VTEP device 114-A2 may maintain floodlist 150-A2 to include entries that identify local gateway VTEP address(es) for root-sourced traffic. In particular, floodlist 150-A2 may include entry 154-1 identifying root VTEP address 128-A of gateway 110-A and entry 154-2 identifying leaf VTEP address 130-A of gateway 110-A.

VTEP devices 114-B1 and 114-B2 may each maintain (e.g., generate, update, and/or store) its own floodlist (e.g., in the same manner as described in connection with FIGS. 5 and 8). In particular, because VTEP-B1 has a leaf designation (e.g., is attached to leaf host H3), VTEP device 114-B1 may maintain floodlist 150-B1 to include entries that only identify local gateway VTEP address(es) for leaf-sourced traffic. In particular, floodlist 150-B1 may include entry 156 identifying root VTEP address 128-B of gateway 110-B. Because VTEP-B2 has a root designation (e.g., is attached to root host H4), VTEP device 114-B2 may maintain floodlist 150-B2 to include entries that identify local gateway VTEP address(es) for root-sourced traffic. In particular, floodlist 150-B2 may include entry 158-1 identifying root VTEP address 128-B of gateway 110-B and entry 158-2 identifying leaf VTEP address 130-B of gateway 110-B.

In other words, root VTEPs VTEP-A2 and VTEP-B2 (e.g., devices 114-A2 and 114-B2 implementing VTEP-A2 and VTEP-B2, respectively) may each import all (e.g., both leaf-tagged and root-tagged) local-gateway-advertised IMET routes (e.g., for both the root and leaf VTEP addresses of the local gateway) into its floodlist, while leaf VTEPs VTEP-A1 and VTEP-B1 (e.g., devices 114-A1 and 114-B1 implementing VTEP-A1 and VTEP-B1, respectively) may each import only the root-tagged local-gateway-advertised IMET route (e.g., for the root VTEP address of the local gateway) into its floodlist. Accordingly, the resulting floodlist 150-A1 for leaf VTEP-A1 contains root VTEP address 128-A of local gateway 110-A, the resulting floodlist 150-A2 for root VTEP-A2 contains root and leaf VTEP addresses 128-A and 130-A of local gateway 110-A, the resulting floodlist 150-B1 for leaf VTEP-B1 contains root VTEP address 128-B of local gateway 110-B, and the resulting floodlist 150-B2 for root VTEP-B2 contains root and leaf VTEP addresses 128-B and 130-B of local gateway 110-B.

Configured in the manner described in connection with FIG. 15, gateways 110-A and 110-B and corresponding local VTEP devices 114 may facilitate the desired handling of BUM traffic flooding for EVPN E-tree service without a source VTEP lookup operation at the local (e.g., ingress-side) gateway. FIG. 16 shows how gateways 110-A and 110-B and a local VTEP device such as device 114-A1 (e.g., for implementing VTEP-A1) handle BUM traffic sourced from a leaf host such as host H1 attached to VTEP-A1.

VTEP device 114-A1 for VTEP-A1 may use its local floodlist 150-A1 to flood (e.g., forward) traffic to root VTEP address 128-A of gateway 110-A and not leaf VTEP address 130-A of gateway 110-A. Local traffic from local VTEP device 114-A1 appearing on (e.g., destined for) root VTEP address 128-A of gateway 110-A may be sent from gateway 110-A to gateway 110-B using the same root VTEP address 128-A of gateway 110-A, thereby omitting a source lookup operation at gateway 110-A (e.g., omitting the source lookup operation described in connection with FIGS. 13 and 14).

Upon reception of the BUM traffic with the source being root VTEP address 128-A of gateway 110-A, gateway 110-B may determine that the received BUM traffic is leaf-sourced. In particular, gateway 110-B may make this determination by performing a lookup operation that compares the source VTEP address in the BUM traffic to information stored based on the gateway-110-A-advertised IMET route in message 140-3 (FIG. 12) indicating the previously advertised VTEP address 128-A of gateway 110-A is designated for leaf-sourced traffic. Based on the source VTEP address of the received BUM traffic matching the previously advertised root VTEP address 128-A of gateway 110-1, gateway 110-B may flood the received leaf-sourced BUM traffic using its local leaf traffic floodlist 134-B to appropriately reach root VTEP-B2 on device 114-B2 and root host H4.

FIG. 17 shows how gateways 110-A and 110-B and a local VTEP device such as device 114-A2 (e.g., for implementing VTEP-A2) handle BUM traffic sourced from a root host such as host H2 attached to VTEP-A2. VTEP device 114-A2 for VTEP-A2 may use its local floodlist 150-A2 to flood (e.g., forward) traffic to root VTEP address 128-A of gateway 110-A and to leaf VTEP address 130-A of gateway 110-A, thereby replicating and/or splitting the BUM traffic. Local traffic from local VTEP device 114-A2 appearing on (e.g., destined for) root VTEP address 128-A of gateway 110-A may be sent from gateway 110-A to gateway 110-B using the same root VTEP address 128-A of gateway 110-A. Local traffic from local VTEP device 114-A2 appearing on (e.g., destined for) leaf VTEP address 130-A of gateway 110-A may be sent from gateway 110-A to gateway 110-B using the same leaf VTEP address 130-A of gateway 110-A.

This illustrative handling of local traffic may enable the omission of a source lookup operation at gateway 110-A (e.g., omission of the source lookup operation described in connection with FIGS. 13 and 14).

Upon reception of the first and second separate BUM traffic portions with the sources being root and leaf VTEP addresses 128-A and 130-A of gateway 110A, respectively, gateway 110-B may flood the first and second BUM traffic portions using respective floodlists 131-B and 134-B. In particular, the BUM traffic portion sourced with root VTEP address 128-A of gateway 110-A may be flooded with leaf traffic floodlist 134-B and the BUM traffic portion sourced with leaf VTEP address 130-A of gateway 110-A may be flooded with root traffic floodlist 131-B. Because the two local floodlists 131-B and 134-B at gateway 110-B are disjoint (e.g., have no common members or entries), the combined flooding of the two received BUM traffic portions from gateway 110-A appropriately reach leaf VTEP-B1 on device 114-B1 and host H3, and root VTEP-B2 on device 114-B2 and host H4.

While, in connection with FIGS. 15-17, VTEP addresses 128-A and 130-A of gateway 110-A are described as "root" and "leaf," respectively, and corresponding floodlists 134-B and 131-B of gateway 110-B are described as "leaf traffic" and "root traffic," respectively, this is merely one illustrative (naming) convention. Gateway 110-B may generally include a set of (e.g., two) floodlists with mutually exclusive membership and can perform one or more lookup operations to identify an appropriate first subset of the floodlists (e.g., a first floodlist) to use to flood traffic from a first VTEP address of gateway 110-A and/or to identify an appropriate second subset of the floodlists (e.g., a second floodlist) to use to flood traffic from a second VTEP address of gateway 110-A (e.g., with the first floodlist being used to flood leaf-sourced traffic and the first and second floodlists being used to flood root-sourced traffic).

Figure 19:
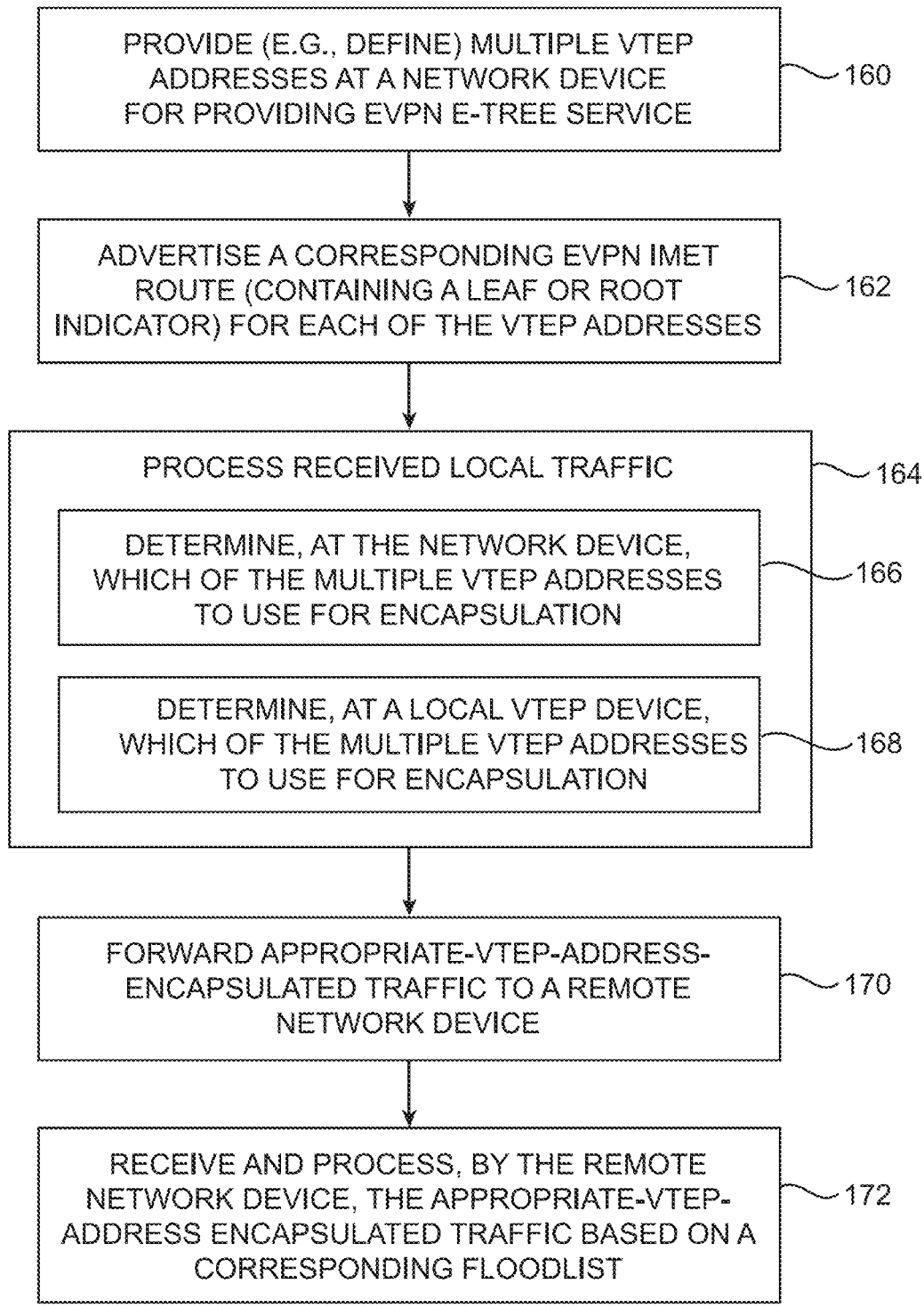
FIG. 19 is a flowchart of illustrative operations for configuring network devices in an additional setting to implement EVPN E-tree service in accordance with some embodiments.

FIG. 19 is a flowchart of illustrative operations for providing traffic handling for EVPN E-tree service. These operations may be performed by one or more EVPN peer network devices such as devices 110-A, 110-B, 114-A1, 114-A2, 114-B1, and 114-B2 in FIGS. 11-17 or more specifically by corresponding control plane processing circuitry 28 in each of these devices and/or by corresponding packet processor(s) 32 in each of these devices (FIG. 2). One or more (e.g., all) illustrative operations described in connection with FIG. 19 may generally be performed by control plane processing circuitry 28 and/or packet processor(s) 32 executing software instructions stored on corresponding memory circuitry 30 (FIG. 2) in each of these devices (e.g., instructions stored on one or more non-transitory computer-readable storage media). If desired, one or more operations described in connection with FIG. 19 may be performed by other dedicated hardware components in each device or performed separately from these devices.

At block 160, a first (local) network device such as a site gateway (e.g., control plane processing circuitry 28 thereon) may provide (e.g., define) multiple VTEP addresses for the first network device. The use of multiple (e.g., at least two VTEP addresses) may help facilitate traffic handling to provide EVPN E-tree service. As an example, a first VTEP address may be associated with and used to encapsulate root-sourced local traffic (e.g., from one or more local root hosts, from all local root hosts in the site, etc.) and a second VTEP address may be associated with and used to encapsulate leaf-sourced local traffic (e.g., from one or more local leaf hosts, from all local leaf hosts in the site, etc.).

At block 162, the first network device (e.g., control plane processing circuitry 28 thereon) may advertise a corresponding EVPN IMET (type-3) route for each of the defined multiple VTEP addresses. Each advertised EVPN IMET route (e.g., each message 140 in FIGS. 12 and 15) may contain an indication of root or leaf designation. As an example, these routes may be advertised to remote peer network device(s) such as a remote site gateway. Based on processing these routes, the remote site gateway may store on its memory circuitry 30 (FIG. 2) information associating the first VTEP address (e.g., when used as encapsulation for the packet source VTEP) with root-sourced traffic from the local network device and information associating the second VTEP address (e.g., when used as encapsulation for the packet source VTEP) with leaf-sourced traffic from the local network device.

If desired, these EVPN IMET routes may also be advertised to local VTEP device(s) implementing one or more root VTEPs attached to root hosts and one or more leaf VTEPs attached to leaf hosts. The local VTEP device(s) (e.g., control plane processing circuitry 28 thereon) may maintain a floodlist for each VTEP with each floodlist identifying one or more of the VTEP addresses defined by the local network devices.

At block 164, the local network device and/or the local VTEP device(s) (e.g., corresponding packet processor(s) 32 thereon) may process the local traffic. Depending on the desired configuration of these devices, processing operations may differ. As a first example, the local network device such as the gateway (e.g., packet processor(s) 32 thereon) may determine (e.g., by a source VTEP lookup operation) which appropriate VTEP address of the multiple VTEP addresses to use for encapsulation (block 166). As a second example, this determination may be omitted in scenarios where the local VTEP device maintains a local floodlist already identifying one or more of the multiple VTEP addresses and therefore determine which appropriate one of the multiple VTEP addresses to use for encapsulation (block 168). In this second example, the local VTEP device (e.g., packet processor(s) 32 thereon) may flood (e.g., forward) the local traffic to the appropriate VTEP address(es) at the local network device.

At block 170, the local network device (e.g., packet processor(s) 32 thereon) may forward (e.g., output) the appropriate-VTEP address-encapsulated traffic toward a remote network device. The appropriate VTEP address for leaf-sourced traffic may be the second (leaf-designated) VTEP address. The appropriate VTEP address for root-sourced traffic may be the first (root-designated) VTEP address. In some illustrative arrangements, both the first and second VTEP addresses may be used to appropriate VTEP addresses for root-sourced traffic (e.g., as described in connection with FIG. 17).

At block 172, the remote network device (e.g., packet processor(s) 32 thereon) may receive and process the appropriate-VTEP-address-encapsulated traffic based on a corresponding floodlist. As one example, the remote network device may maintain a first floodlist identifying both its local leaf and root VTEPs and may flood root-sourced traffic (e.g., encapsulated with the first root-designated VTEP address) to its local leaf and root VTEPs identified in the first floodlist. The remote network device may maintain a second floodlist identifying only its local root VTEPs and may flood leaf-sourced traffic (e.g., encapsulated with the second leaf-designated VTEP address) to only its local root VTEPs identified in the second floodlist. If desired, in scenarios where the first and second floodlists are disjoint (e.g., the first floodlist identifies only its local leaf VTEPs and the second floodlist identifies only its local root VTEPs), the remote network device may process the appropriate-VTEP-address-encapsulated traffic based on both floodlists to reach both leaf VTEPs and root VTEPs (e.g., as described in connection with FIG. 17).

In some illustrative configurations described herein as an example, control plane processing circuitry 28 of respective network devices are used to perform the operations at blocks 160 and 162, whereas packet processor(s) 32 of respective network devices are used to perform the operations at blocks 164, 170, and 172. This is merely illustrative. If desired, any suitable processing circuitry (e.g., control plane processing circuitry and/or data plane processing circuitry) may be used to perform any of the operations described in connection with FIG. 19.

While not explicitly shown in some of the FIGS. herein, conveyance of traffic (e.g., control plane traffic such as EVPN IMET routes and data plane traffic such as BUM and known unicast traffic) between devices such as gateways belonging to different sites and/or between edge devices interfacing for different sites may all be conveyed over an underlay network (e.g., network 8C in FIG. 1, the underlay network in FIG. 3 implementing an MPLS or VXLAN overlay network, the underlay network in FIG. 9 implementing an MPLS or VXLAN overlay network, network 8C in FIG. 11 such as a wide area network or a datacenter interconnect network, etc.).

The foregoing is merely illustrative and various modifications can be made to the described embodiments. The foregoing embodiments may be implemented individually or in any combination.

What is claimed is:

1. A method of handling Ethernet Virtual Private Network (EVPN) routing information, the method comprising:
   receiving, by an EVPN network device, an EVPN Inclusive Multicast Ethernet Tag (IMET) route from a peer EVPN network device,
   wherein the EVPN IMET route includes an Ethernet-tree (E-tree) extended community.

2. The method defined in claim 1, wherein the E-tree extended community includes a root-indication flag.

3. The method defined in claim 1, wherein the E-tree extended community includes a leaf-indication flag.

4. The method defined in claim 3, wherein the E-tree extended community includes a root-indication flag.

5. The method defined in claim 3, wherein the leaf-indication flag has a set value that is indicative of the peer EVPN network device being configured with a leaf attachment circuit.

6. The method defined in claim 3, wherein the EVPN IMET route includes a Virtual Extensible Local Area Network (VXLAN) network identifier.

7. The method defined in claim 1 further comprising:
   performing, by the EVPN network device, filtering of network traffic based on the received EVPN IMET route.

8. The method defined in claim 7, wherein the network traffic comprises broadcast, unknown unicast, or multicast (BUM) traffic.

9. The method defined in claim 7 further comprising:
   maintaining, by the EVPN network device, a floodlist stored at the EVPN network device based on the received EVPN IMET route.

10. The method defined in claim 9, wherein performing filtering of the network traffic comprises performing filtering of the network traffic based on the maintained floodlist.

11. A method of operating an Ethernet Virtual Private Network (EVPN) network device, the method comprising:
    storing, by the EVPN network device, a floodlist; and
    selectively updating, by the EVPN network device, the stored floodlist based on one or more EVPN Inclusive Multicast Ethernet Tag (IMET) routes, at least some of which include an Ethernet-tree (E-tree) extended community.

12. The method defined in claim 11, wherein a given one of the one or more EVPN IMET routes is advertised by a peer EVPN network device and lacks the E-tree extended community and wherein selectively updating the stored floodlist comprises selectively updating, by the EVPN network device, the stored floodlist to store an indication of the peer EVPN network device.

13. The method defined in claim 11, wherein a given one of the one or more EVPN IMET routes is advertised by a peer EVPN network device and includes the E-tree extended community and wherein selectively updating the stored floodlist comprises selectively updating, by the EVPN network device, the stored floodlist to exclude an indication of the peer EVPN network device.

14. The method defined in claim 11, wherein a given one of the one or more EVPN IMET routes is advertised by a peer EVPN network device and includes the E-tree extended community and wherein selectively updating the stored floodlist comprises selectively updating, by the EVPN network device, the stored floodlist to store an indication of the peer EVPN network device.

15. The method defined in claim 11, wherein the EVPN network device is a provider edge network device, the method further comprising:
    forwarding, by the provider edge network device, network traffic based on the floodlist.

16. The method defined in claim 15, wherein the network traffic comprises broadcast, unknown unicast, or multicast (BUM) traffic.

17. The method defined in claim 11, wherein the E-tree extended community includes a leaf-indication flag and a root-indication flag.

18. A method of conveying Ethernet Virtual Private Network (EVPN) routing information, the method comprising:
    transmitting, by an EVPN network device, an EVPN route advertisement message toward one or more peer EVPN network devices,
    wherein the EVPN route advertisement message includes an Ethernet-tree (E-tree) extended community,
    wherein the E-tree extended community includes a root-indication flag and includes a leaf-indication flag, and
    wherein the EVPN route advertisement message is an EVPN Inclusive Multicast Ethernet Tag (IMET) route.

19. The method defined in claim 18, wherein the root-indication flag, when set, indicates an association with a root site and wherein the leaf-indication flag, when set, indicates an association with a leaf site.

* * * * *